PREFERENCE CHANNEL SELECTOR FOR SWITCHING NETWORK MARKER

Filed March 15, 1967

INVENTORS
E. L. ERWIN
J. P. FIELD
R. J. MAHOOD
R. COHEN

ATTORNEY

Sept. 15, 1970 E. L. ERWIN ET AL 3,529,094

PREFERENCE CHANNEL SELECTOR FOR SWITCHING NETWORK MARKER

Filed March 15, 1967 19 Sheets-Sheet 2

PREFERENCE CHANNEL SELECTOR FOR SWITCHING NETWORK MARKER
Filed March 15, 1967
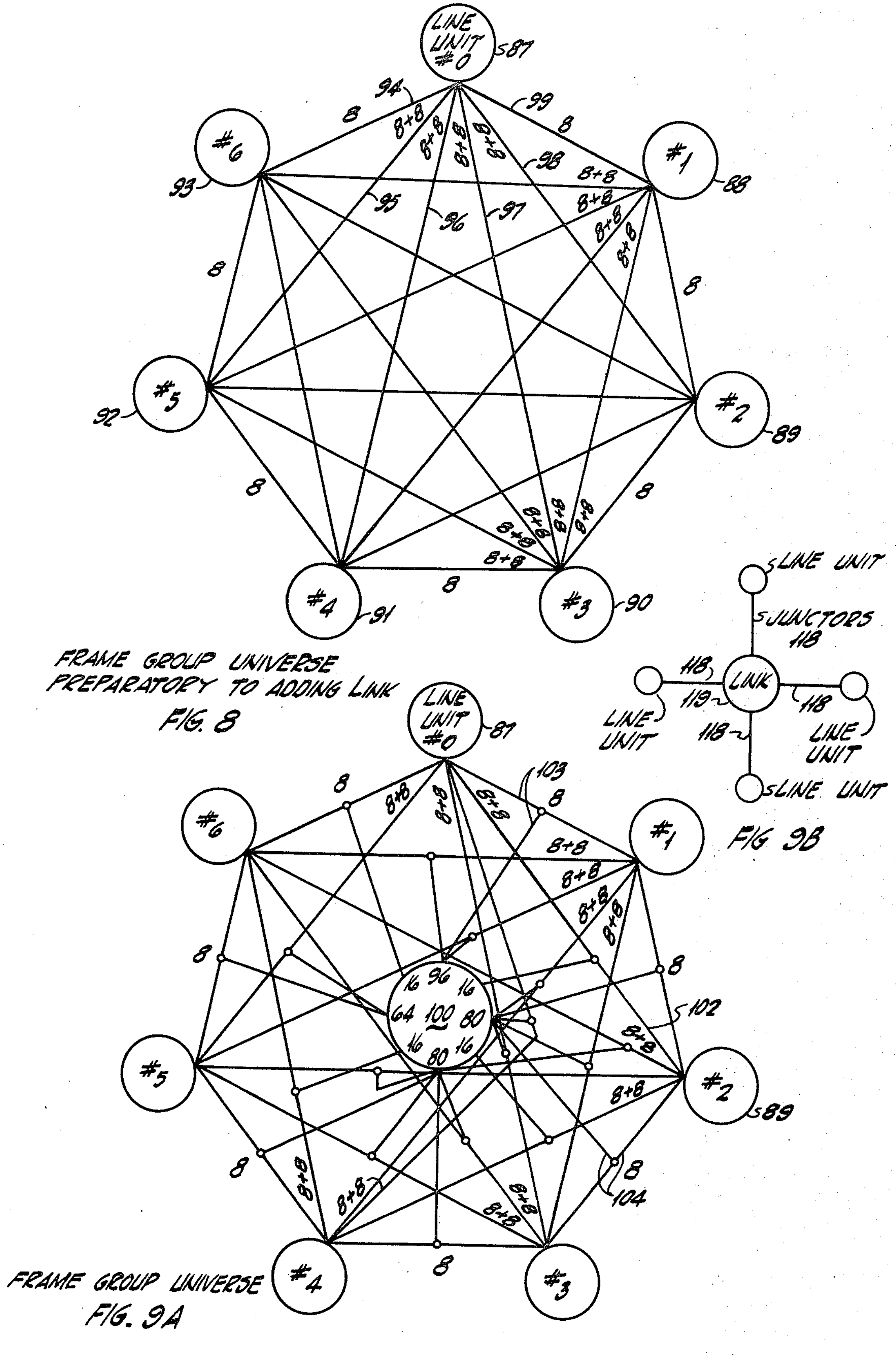
FRAME GROUP UNIVERSE PREPARATORY TO ADDING LINK FIG. 8, FIG. 9B, FRAME GROUP UNIVERSE FIG. 9A Sept. 15, 1970 E. L. ERWIN ET AL 3,529,094

PREFERENCE CHANNEL SELECTOR FOR SWITCHING NETWORK MARKER

Filed March 15, 1967 19 Sheets-Sheet 4

Sept. 15, 1970 E. L. ERWIN ET AL 3,529,094

PREFERENCE CHANNEL SELECTOR FOR SWITCHING NETWORK MARKER

Filed March 15, 1967 19 Sheets-Sheet 7

Sept. 15, 1970 E. L. ERWIN ET AL 3,529,094

PREFERENCE CHANNEL SELECTOR FOR SWITCHING NETWORK MARKER

Filed March 15, 1967 19 Sheets-Sheet 9

Sept. 15, 1970 E. L. ERWIN ET AL 3,529,094

PREFERENCE CHANNEL SELECTOR FOR SWITCHING NETWORK MARKER

Filed March 15, 1967 19 Sheets-Sheet 10

PREFERENCE CHANNEL SELECTOR FOR SWITCHING NETWORK MARKER

Filed March 15, 1967

FIG. 22b
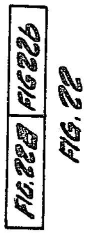
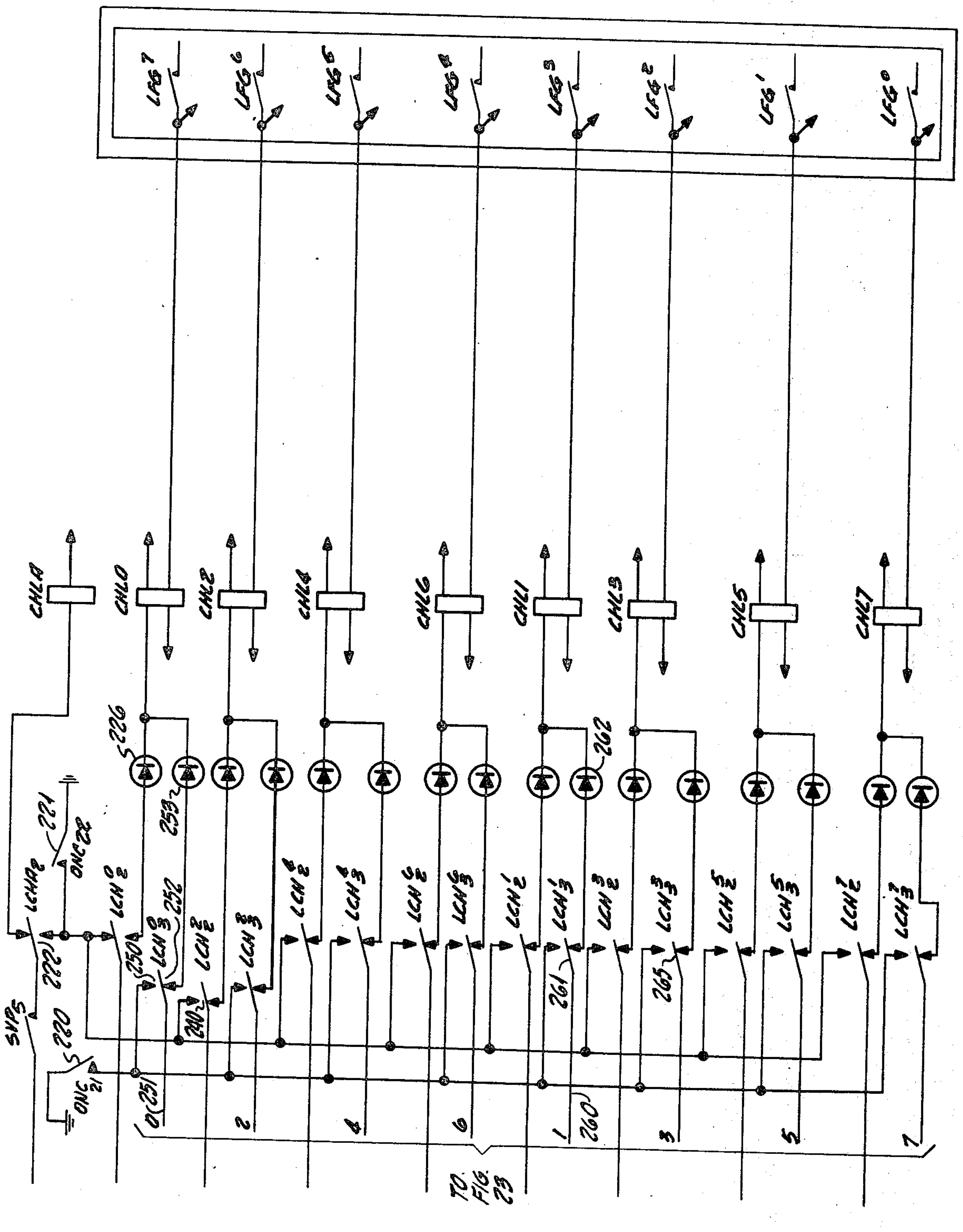

PREFERENCE CHANNEL SELECTOR FOR SWITCHING NETWORK MARKER

Filed March 15, 1967

Sept. 15, 1970 E. L. ERWIN ET AL 3,529,094

PREFERENCE CHANNEL SELECTOR FOR SWITCHING NETWORK MARKER

Filed March 15, 1967 19 Sheets-Sheet 18

United States Patent Office 3,529,094
Patented Sept. 15, 1970

3,529,094
PREFERENCE CHANNEL SELECTOR FOR SWITCHING NETWORK MARKER

Edson L. Erwin, Towaco, N.J., and Joseph P. Field, Hato Rey, Robert J. Mahood, Miramar, and Roger Cohen, Bayamon, Puerto Rico, assignors to International Telephone and Telegraph Corporation, New York, N.Y., a corporation of Maryland Filed Mar. 15, 1967, Ser. No. 623,339
Int. Cl. H04q 3/42
U.S. Cl. 179—18 18 Claims

ABSTRACT OF THE DISCLOSURE

A channel selector for a multistage switching system (such as a crossbar system) selects a switching path between calling and called points of access. A plurality of paths extend between these points, the various paths including different numbers of cascaded stages. The channel selector selects the shortest and most direct path through the least number of stages which is then idle and available. The criteria for network layout and path selection area: (1) the shortest available path should be selected and (2) the path should go through a progressively larger number of stages as the size of the system increases.

This invention relates to common control, channel selector circuits for switching networks and more particularly to circuits for selecting a path in a preferred one of many alternative modes of extending paths through a network of crosspoints.

Recently developed switching circuits include a unitary array of crosspoints for selectively completing path between pre-selected network end points. The exact nature of the network is not too important; it could be almost any one of many electronic or glass reed networks. However, a preferred embodiment of the invention uses a plurality of crossbar switches arranged to operate in a unit—as disclosed in a co-pending application entitled, "Automatic Switching Matrix," Ser. No. 430,136, filed Feb. 3, 1965, by Erwin, Field, and Mahood, and assigned to the assignee of this invention now Pat. 3,441,677.

To reduce costs and increase the efficiency of a switching system, the unitary array of crosspoints is given an ability to complete a desired switch path in any one of several different optional modes. For example, if such path is then idle, a first and preferred mode of network operation uses a very short path which makes busy, or otherwise unavailable the other calls, the fewest number of crosspoints. If the shortest path is not available, the next preferred mode of network operation requires the switch path to be of an intermediate length, making a greater number of crosspoints unavailable to other calls. As the system grows in size and switching becomes more complex, the path may take different and longer paths, each rendering still more crosspoints unavailable to other calls. The point is that the system should always select and operate in the mode which makes the fewest number of crosspoints unavailable to other calls, considering the then existing availability of equipment.

To facilitate and simplify the process of mode selection, one circuit in a portion of the network which must be included in every path is designated as being synomymous with a channel. A channel is available for selection when it and the pieces of equipment connected to its two ends are found to be idle. Thus, the selection of the channel necessarily selects both the switch path and the mode of operation. The selection of the remainder of the desired switch path then occurs automatically after the channel selection has been made, and the path may be completed in a routine manner. In the specification which follows, the channel number is the same as a junctor number; however, this particular association of terms is not to be taken as a necessary limitation upon the scope of the claims.

A channel selector is the device for selecting the channel and, therefore, both the mode of operation and the switch path which is to be completed. The channel which is so selected is the one which allows the system to operate in the mode having the highest preference that is then available. For the channel selector to operate, the origin and destination of the desired switch paths are first designated, as by a demand signal (such as an "off-hook" signal) followed by dial pulse registrations, for example. Then, the information identifying this origin and destination is matched against the idle and available conditions of equipments which are able to complete the desired path. The match occurs on an idle path having the highest available preference, and it is thereupon selected.

An object of the invention is, therefore, to provide channel selectors for automatic switching networks capable of operating in different preference modes. More particularly, an object is to select the mode of network operation having the highest available preference from among many optional modes. A further object is to select an idle channel having the highest available preference. In this connection, an object is to select one circuit in a portion of the network which must be included in every switch path.

A further object of the invention is to provide new and improved switching networks. Here an object is to reduce the overall cost of a switching network by combining a switching array and its common control circuits into a compact functional unit.

In keeping with an aspect of this invention, a switching network comprises a unitary array of crosspoint switches having electrically split verticals. The crosspoints associated with one of the vertical splits form the entrance points for switch paths to be extended through the network. The crosspoints associated with other of the vertical splits form the exit points of these switch paths. Lines are connected to the entrance points. Circuits such as trunks, registers, senders, and the like are connected to the exit points. These circuits are generically called "trunks" hereinafter. The crosspoints associated with still other of the vertical splits include intra-network connection points for common links, junctions, and alternative circuits. The channel selector first tries to complete the shortest path. If that short path is not available, the channel selector then selects a junctor which is common to the desired end points of the switch path. The junctor which is so selected must be idle and able to complete the desired path in the mode of network operation having the highest available preference. This junctor selection, in turn, effectively assigns the vertical or verticals which are to be used to complete the most preferred switch path. Thus, the selection of the channel causes the associated horizontal and vertical magnets to be energized in any well known manner.

The above mentioned and other features of this invention, and the manner of obtaining them will become more apparent, and the invention itself will be best understood by reference to the following description of an embodiment of the invention taken in conjunction with the accompanying drawings, in which:

FIG. 1 is a schematical representation of the mode of completing a path through a prior art crossbar switching network.

FIGS. 2–5 schematically represent a concept of how an improvement may be made over the prior art modes of path connections shown in FIG. 1;

FIG. 8 is another layout showing how a number of the line units of FIG. 7 may be connected together to give still further economically smoooth and uniform growth;

Figure 3:
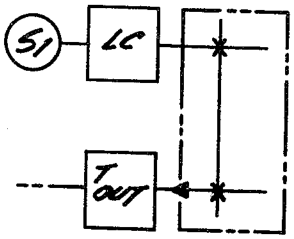
Figure 4:
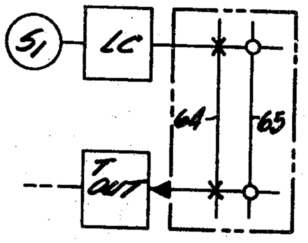
Figure 5:
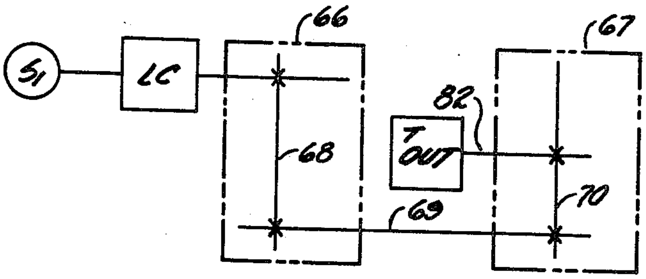
Figure 10:
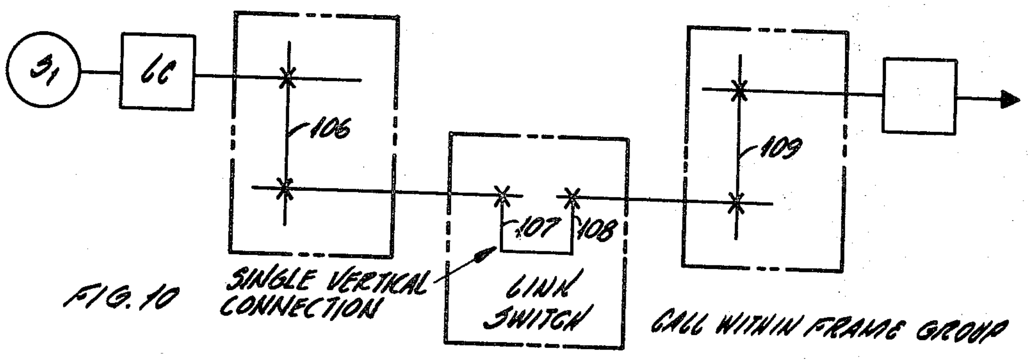
Figure 11:
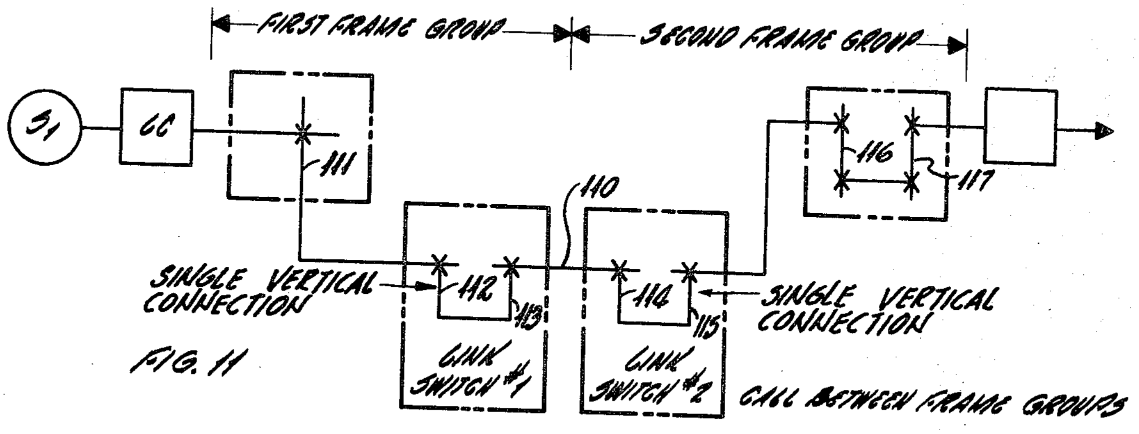
Figure 12:
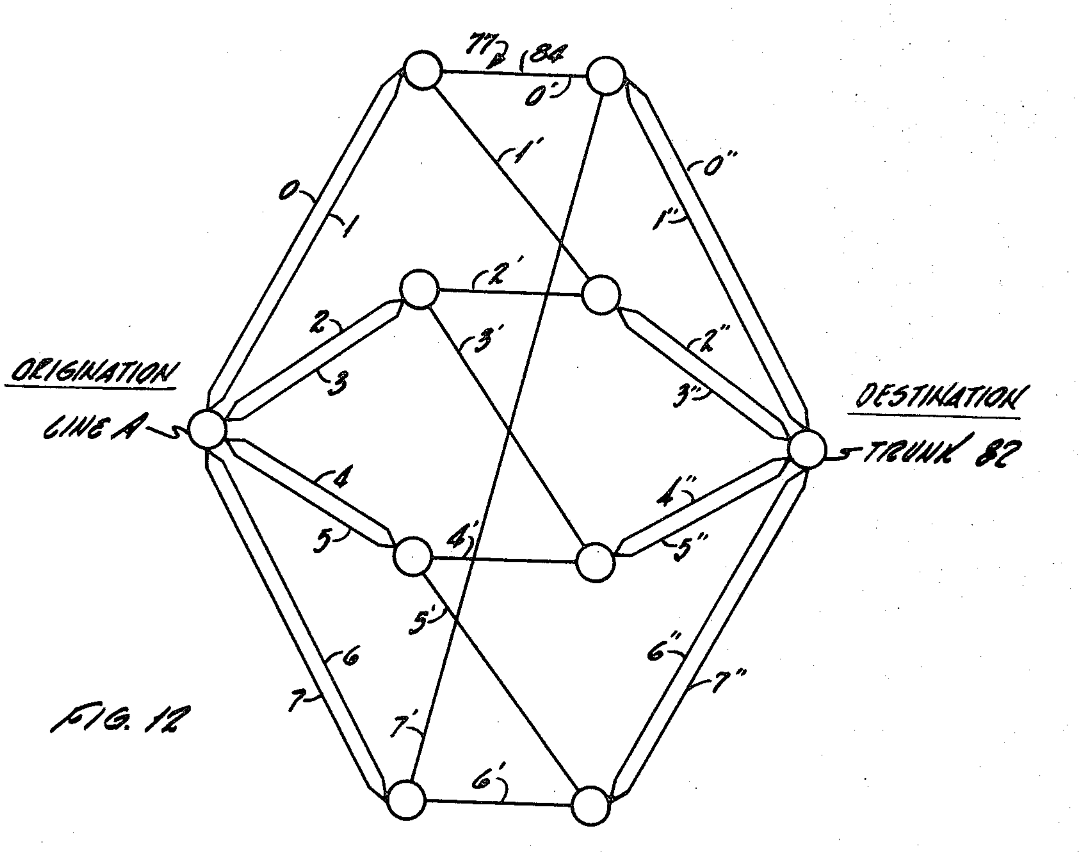
Figure 13:
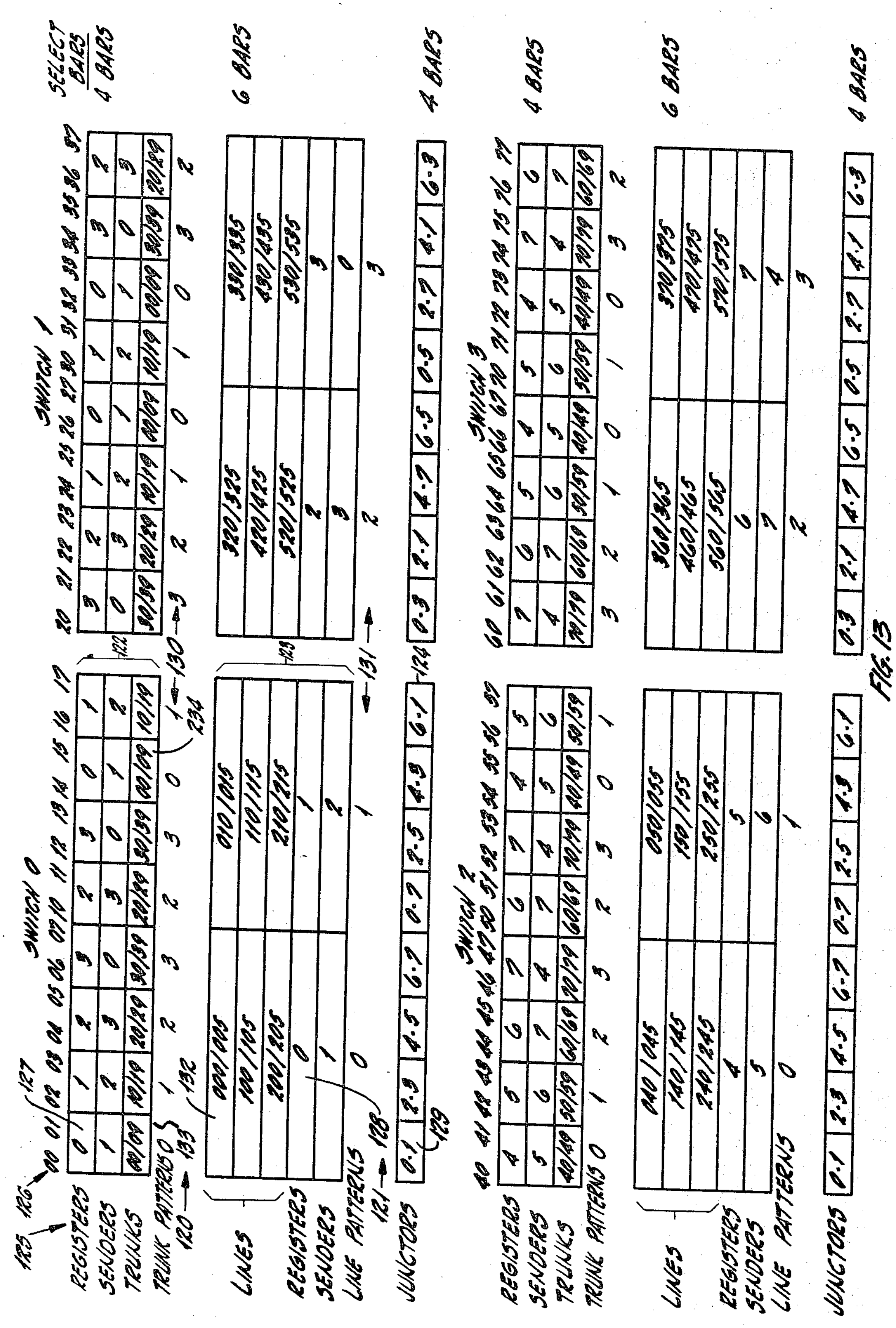
Figure 14:
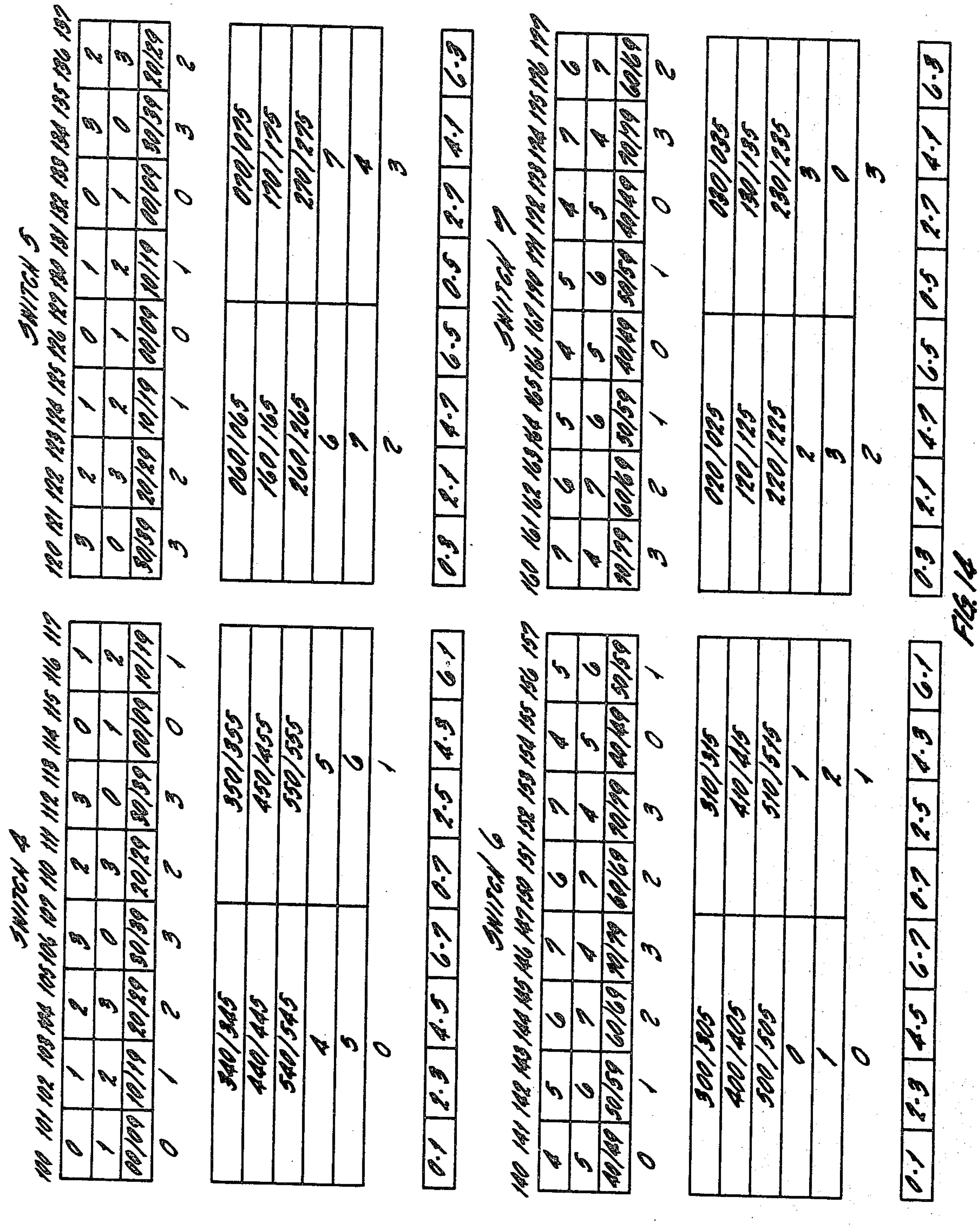
Figures 15, 16:
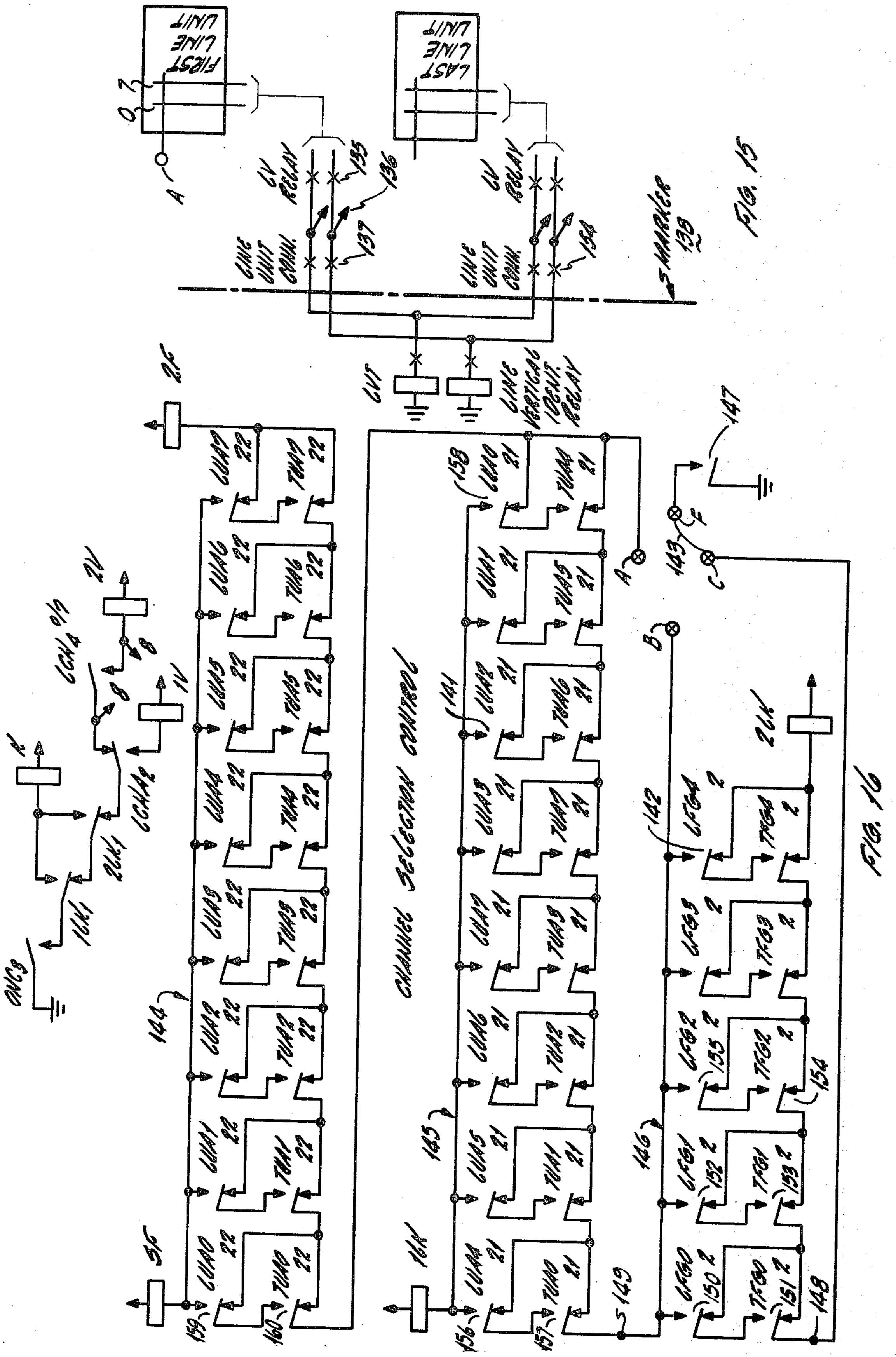
Figure 17:
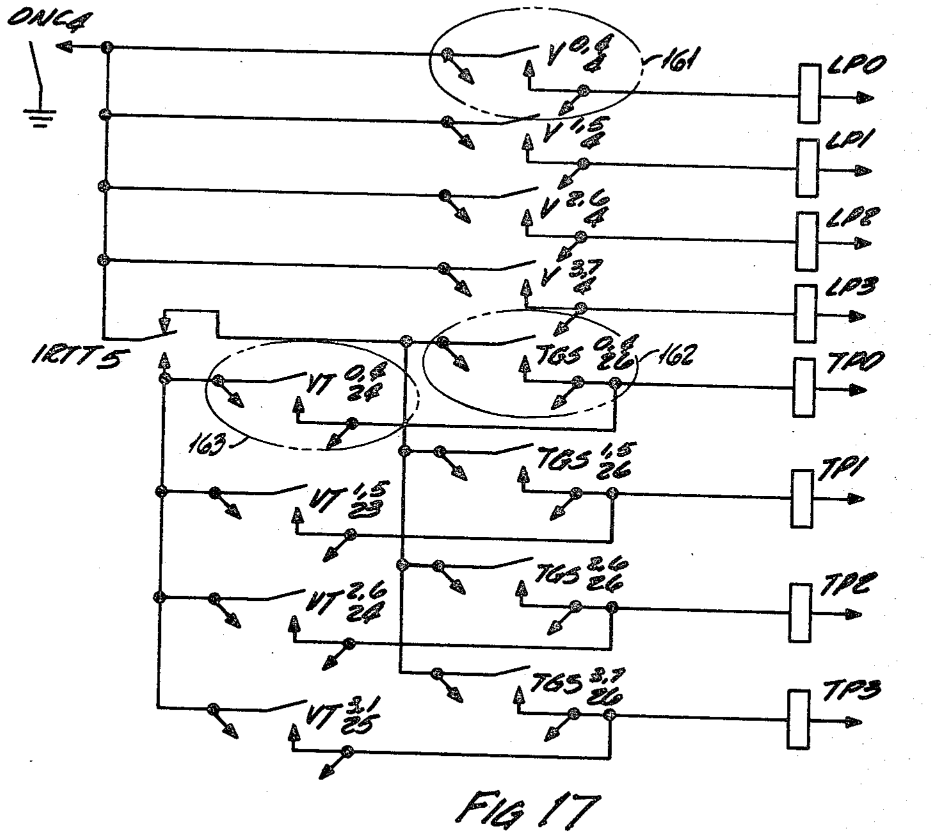
Figure 18:
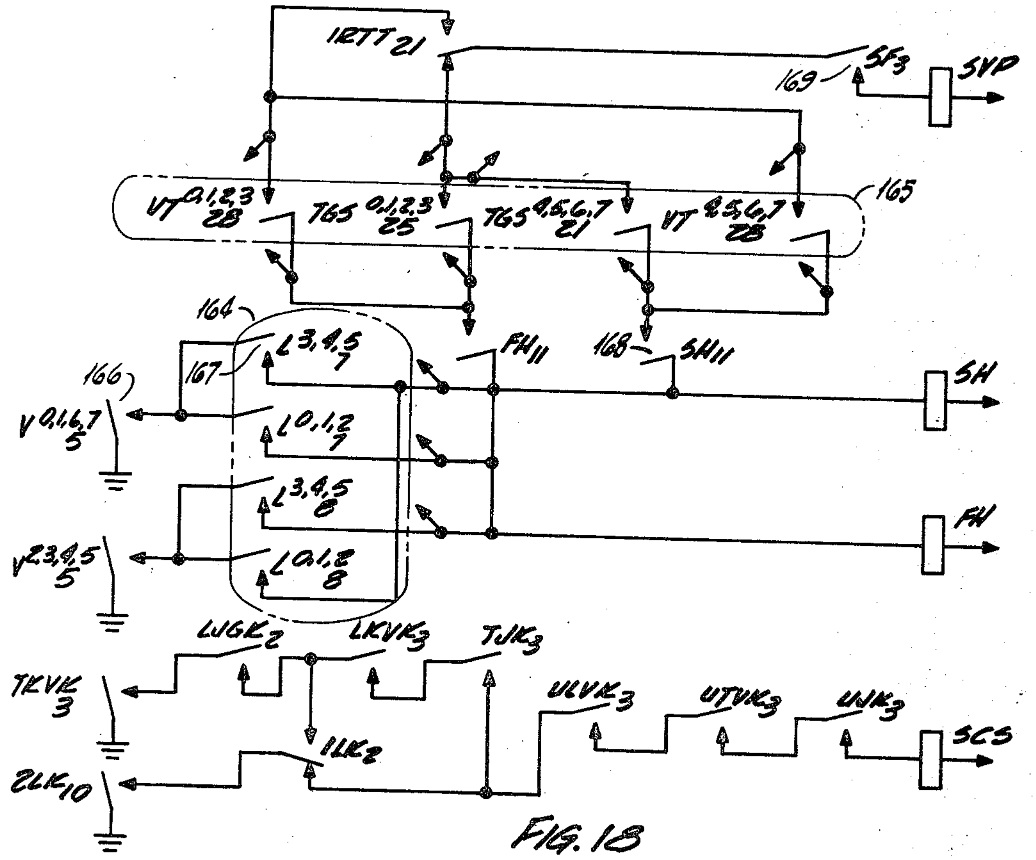
Figure 19:
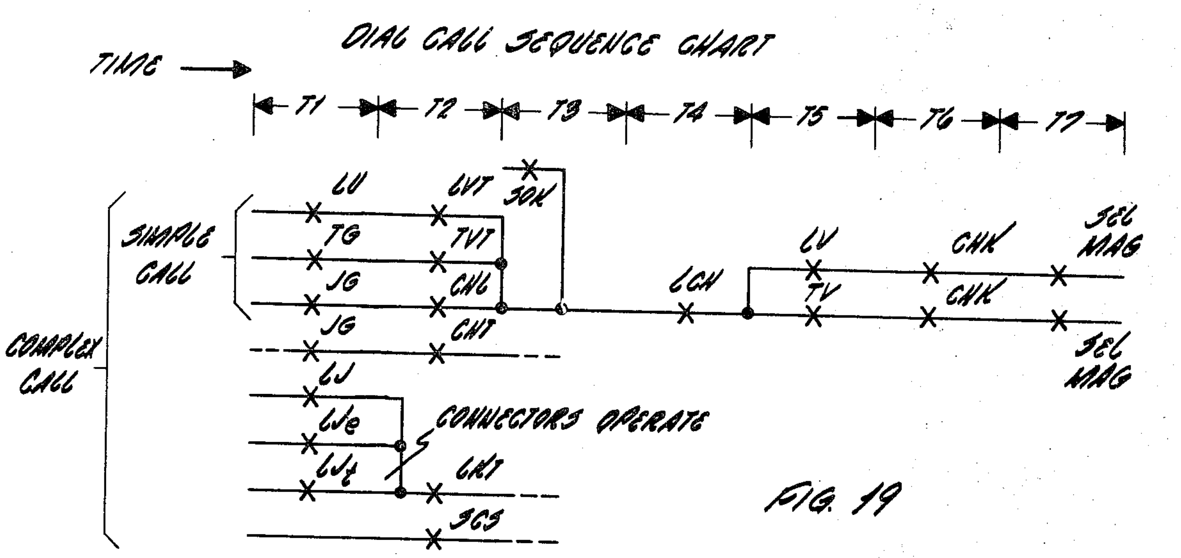
Figure 20:
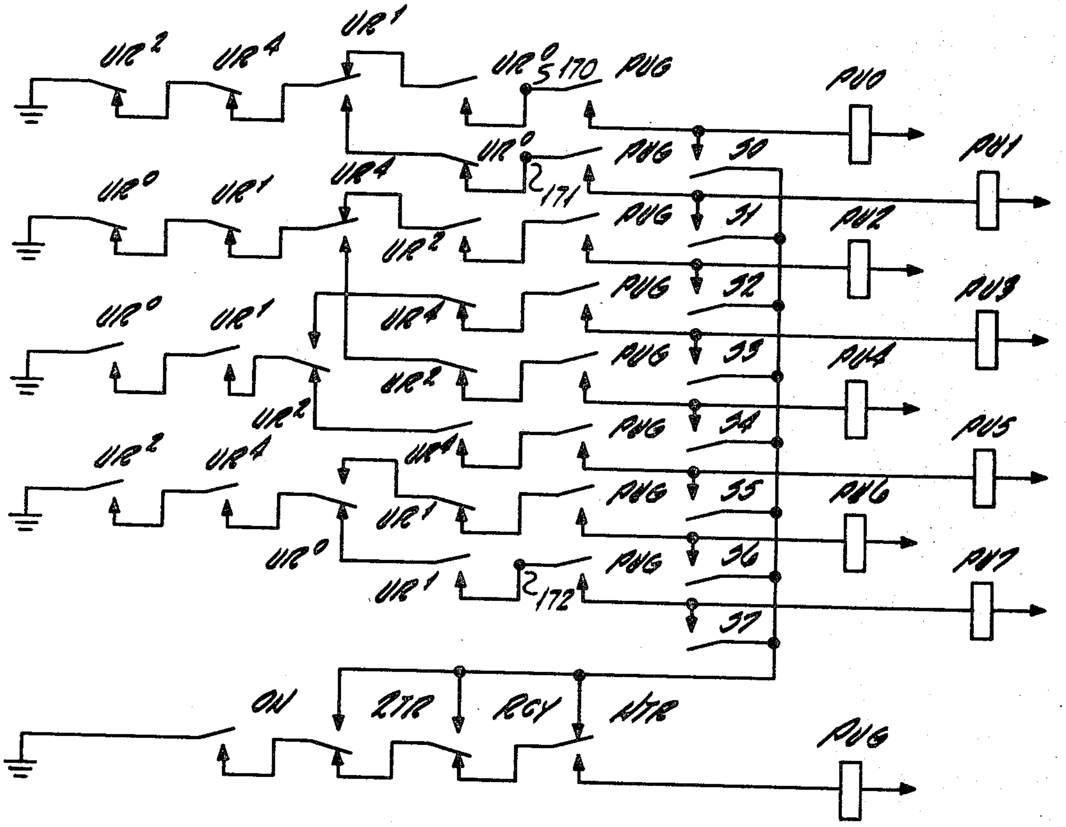
Figure 21:
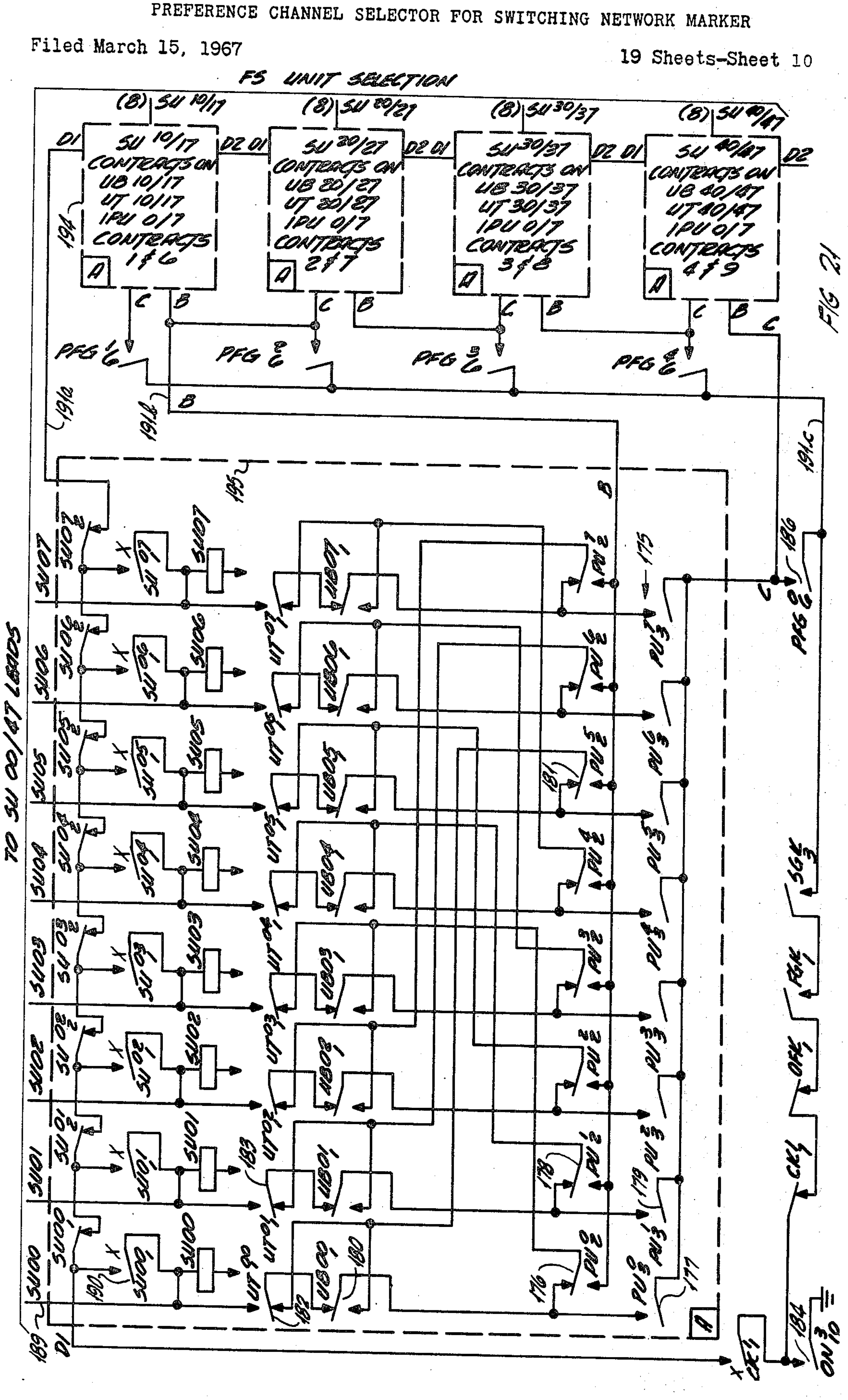
Figure 22A:
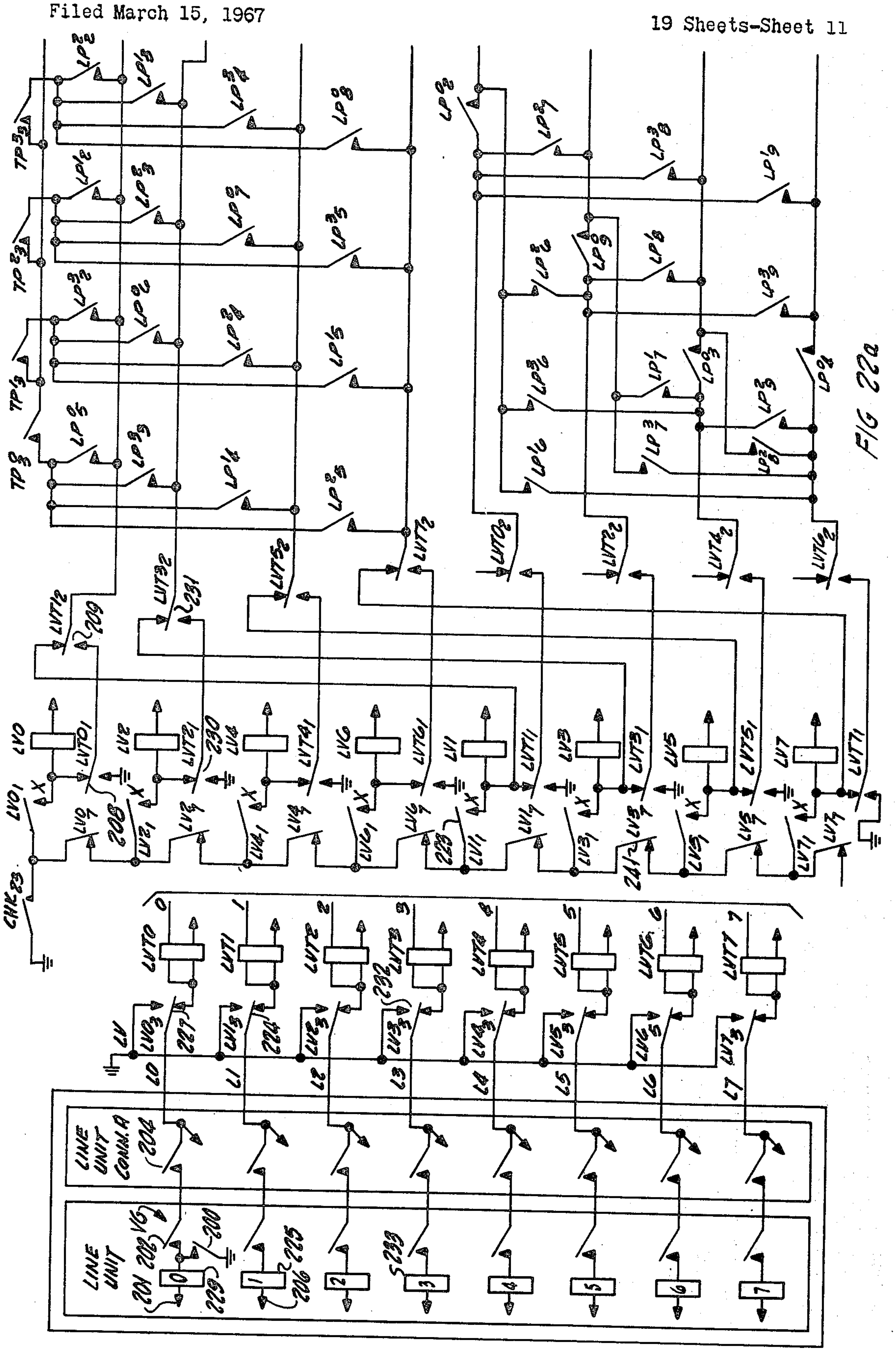
Figure 24:
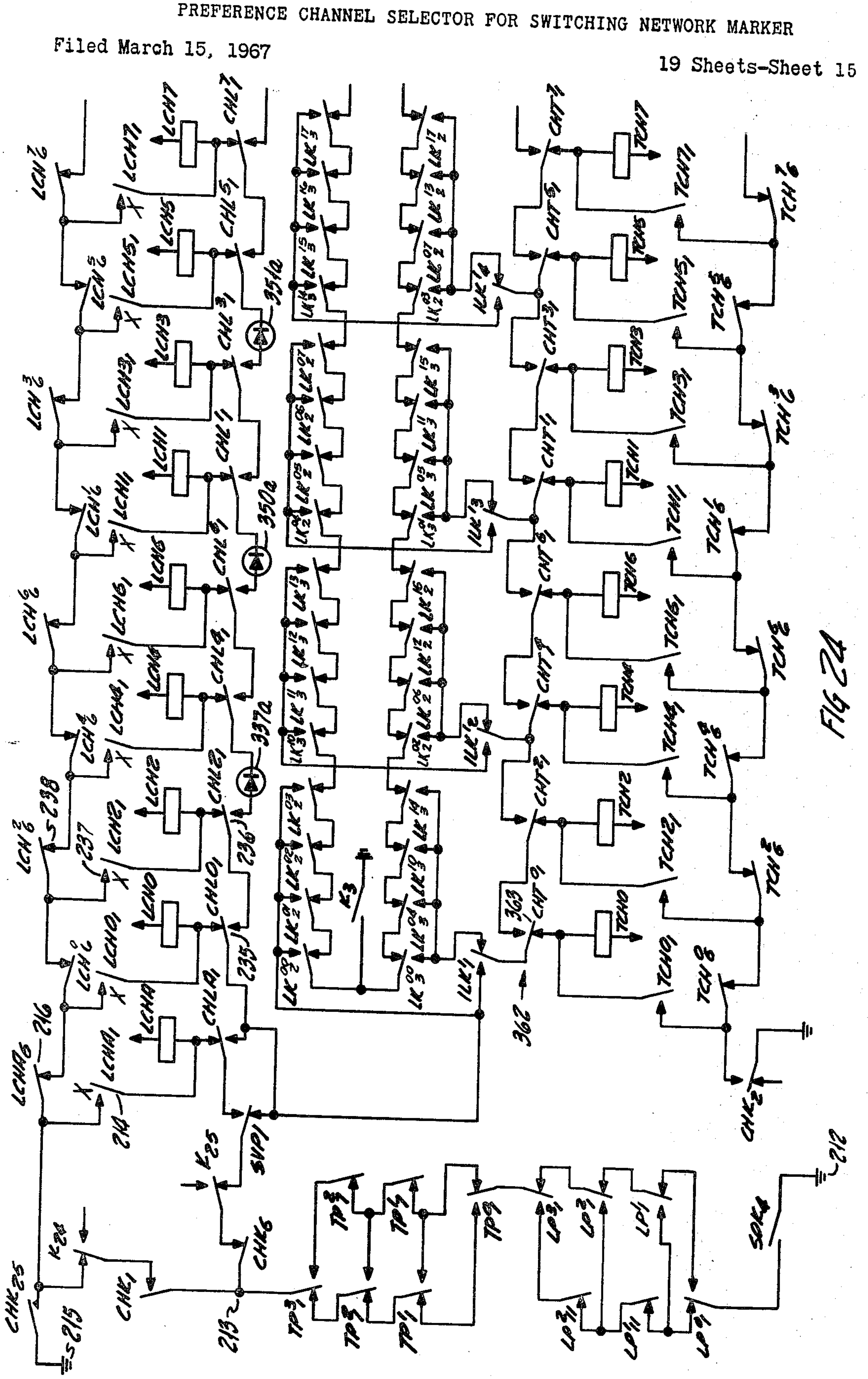
Figures 25A, 25B:
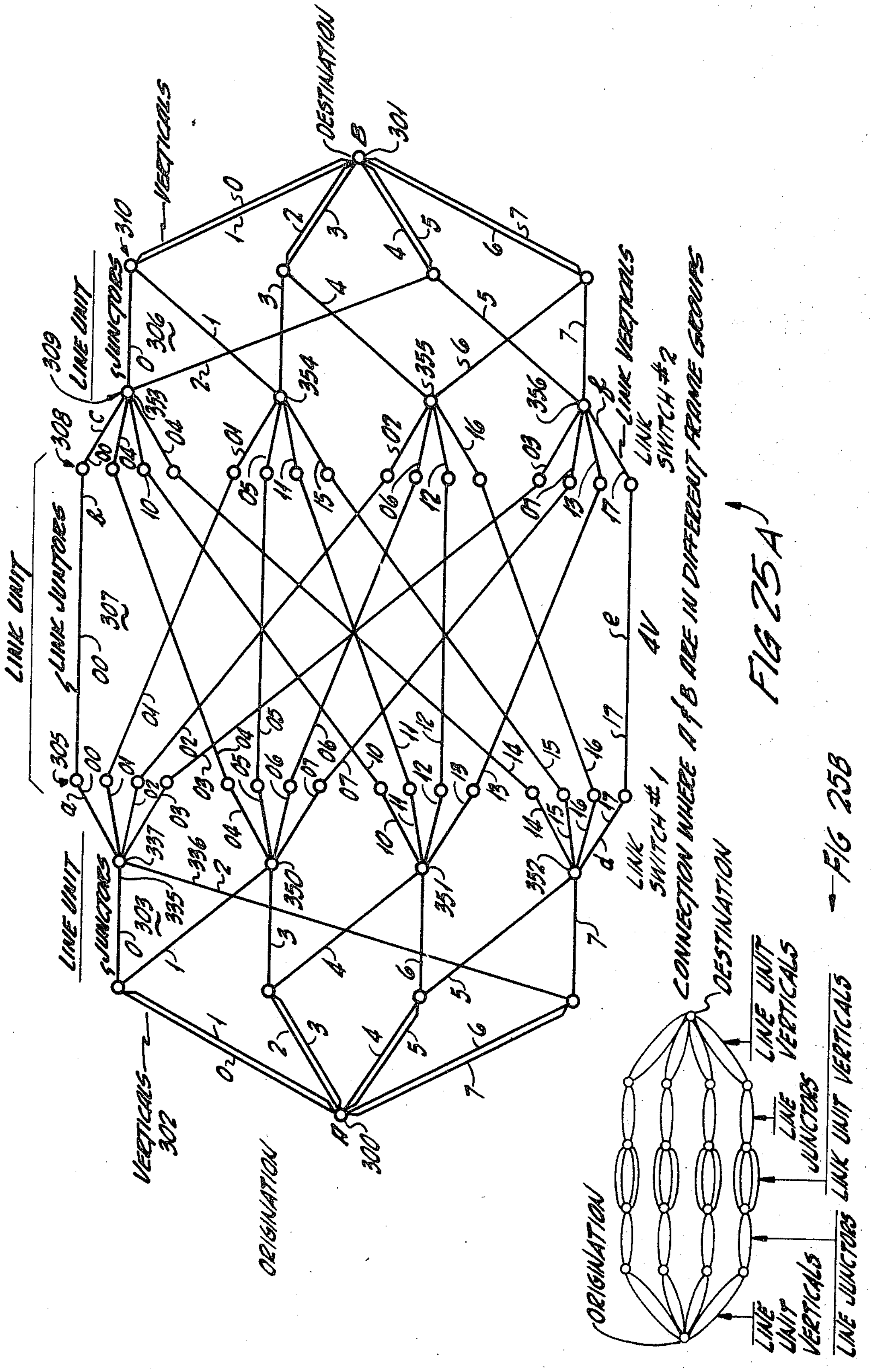
Figure 2C:
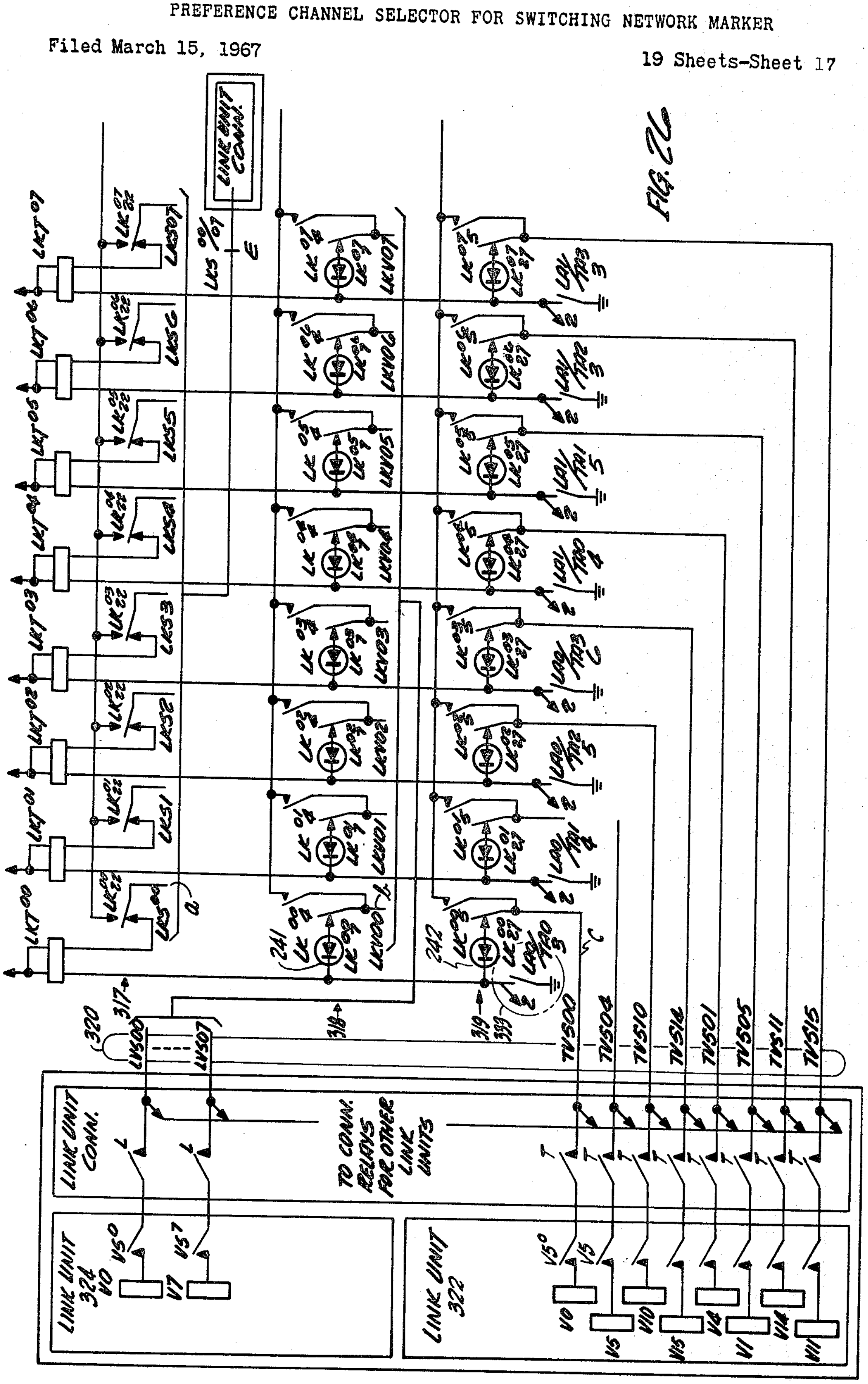
Figures 27, 28:
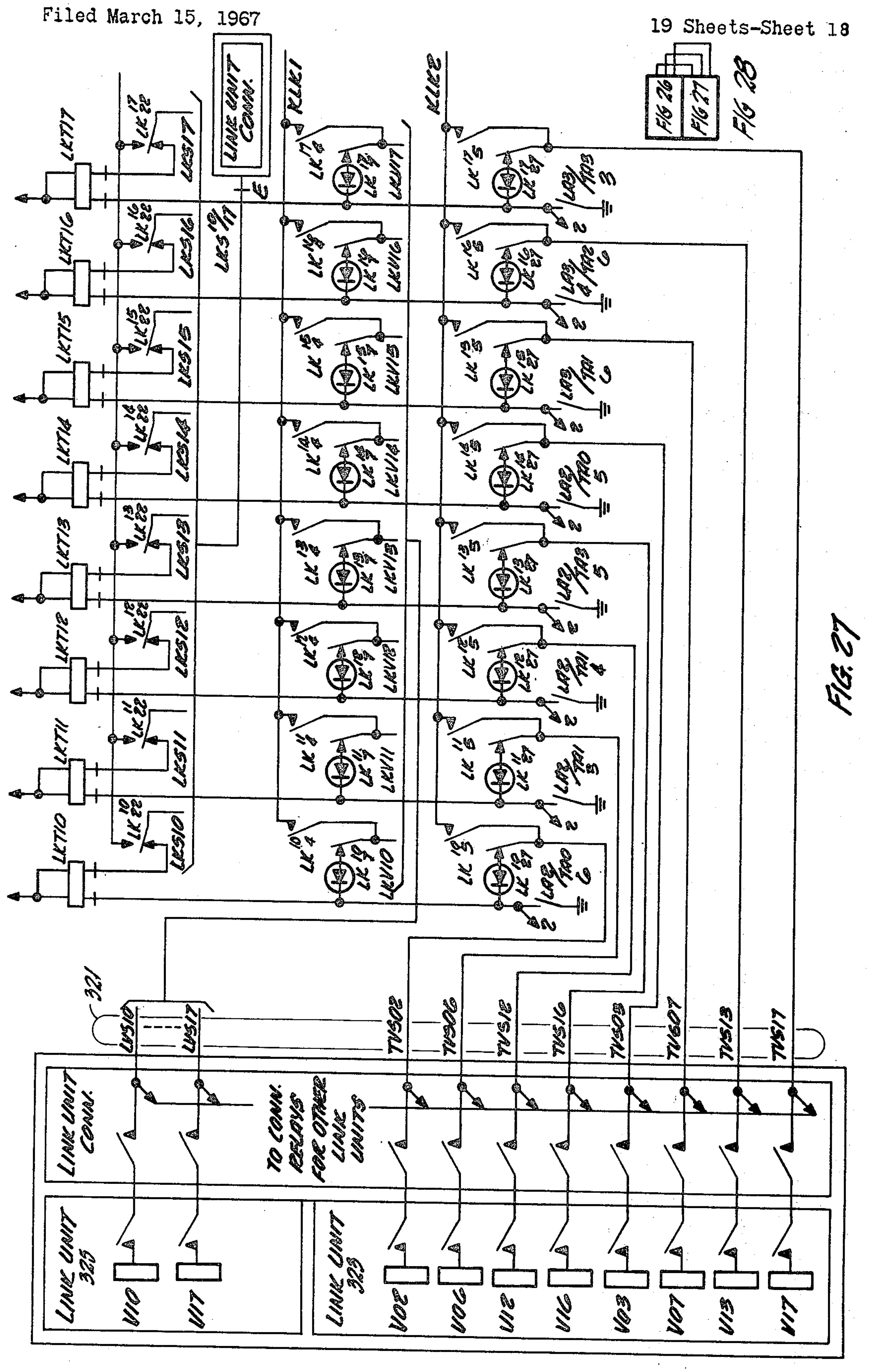
Figure 29:
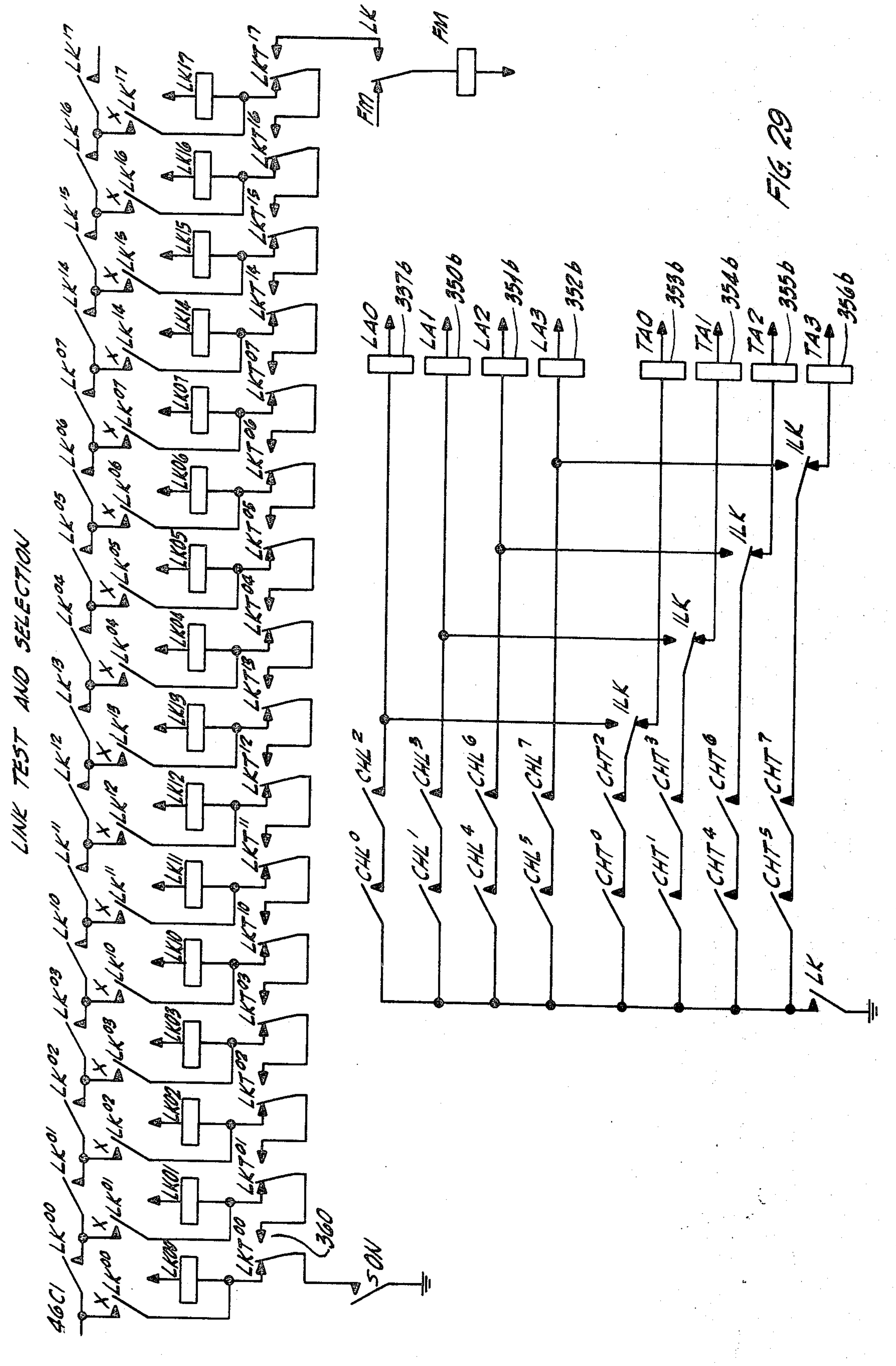

FIGS. 9A and B give two layouts showing how the system may economically grow still more to achieve two larger sizes after the system has reached the maximum efficient size of growth in the pattern of FIG. 8;

FIGS. 10 and 11 are layouts, similar to those of FIGS. 3–5, which illustrate two switch paths through a system which is designed to follow the teachings of FIG. 9;

FIG. 12 is a network lineargraph showing all routes which may be used to complete a simple call such as that shown in FIG. 5;

FIGS. 13 and 14 are assignment tables which disclose the manner and location in which equipment is connected into the crossbar switches;

FIG. 15 is a simplified drawing showing two line units and a marker designed to explain how the common control equipment learns whether certain verticals are busy and derives the coordinate location of the physical equipments represented by the tables of FIGS. 13 and 14;

FIG. 16 is a circuit drawing which explains how the channel selector operates to select a preferred mode of operation;

FIG. 17 is a schematic circuit diagram which discloses how the coordinates of a crosspoint location are translated into line and trunk patterns;

FIG. 18 is a schematic circuit diagram showing how the crosspoint coordinates are utilized to determine whether a single vertical call is possible;

FIG. 19 is a sequence chart explaining when the various relays operate;

FIG. 20 is a schematic circuit diagram showing how the preferred line unit is identified;

FIG. 21 is a schematic circuit diagram showing how an identified line unit is selected or the selection is advanced if the identified unit is busy or otherwise unavailable for this call;

FIGS. 22A and B are schematic circuit diagrams showing a line channel test circuit for identifying available and unavailable channels;

FIGS. 23A and B are schematic circuit diagrams showing a trunk channel test circuit similar to the line channel test circuit of FIG. 22;

FIG. 24 is a schematic diagram showing a channel selection circuit operated in conjunction with the test circuits of FIGS. 21 and 22;

FIGS. 25A and B are two switching network lineargraphs showing two alternative arrangements of all of the paths or alternate routes which are available for attempting to complete a complex call of the type shown in FIG. 10 or 11;

FIGS. 26 and 27 are schematic circuit diagrams showing a link test circuit;

FIG. 28 shows how FIGS. 26, 27 should be joined together to provide a complete circuit; and FIG. 29 is a schematic circuit diagram showing the link channel select circuit.

FIGS. 12 and 25 are switching network lineargraphs which are a network of line joined together at node points. As those skilled in the art know, these lineargraphs show those portions of a multi-stage switching network which may be used to join any two end points to complete a particular type of connection. The node points represent those switches which may be used for this connection, and the lines represent a multiplicity of paths or wiring between these switches. Thus, the lines and nodes represent all possible routes between the two end points which, in turn, represent network inlets and outlets. The switches at the nodes include any and all equipment required to complete the connections between the lines. It is irrelevant whether such switches include one or many crosspoints, as a physical matter. The point is that only one path will be completed from one line through the node point to another line on any given connection attempt.

Figure 1:
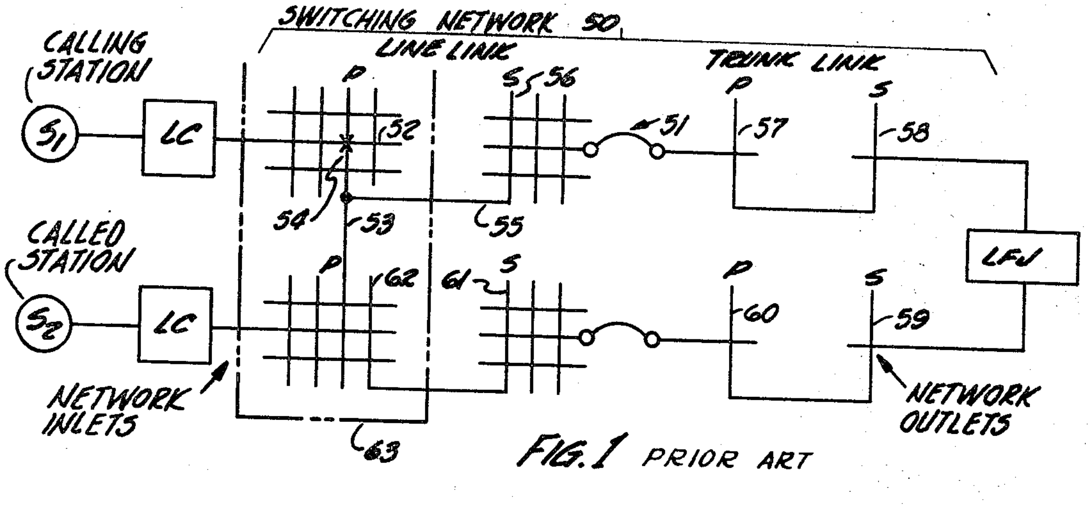
FIG. 1 PRIOR ART

Known crossbar systems may complete switch paths in the general manner depicted by FIG. 1. The stations S1 and S2 generically represent any suitable number of subscriber stations, here assumed to be calling and called stations, respectively. Each subscriber station is connected over a telephone line and through its own individually associated line circuit LC to a switching network 50.

This multi-stage switching network 50 has two sections which are here called "Line Link" and "Trunk Link" sections. The line link location is where lines are connected, and the traffic is least concentrated. The trunk line is where trunks and common equipment (such as LFJ) are connected, and the traffic is most concentrated. The points where the lines are connected are generally called "inlets" and the points where the trunks are connected are generally called "outlets." These two sections of the network are cross-connected at 51 in any convenient wiring pattern.

In FIG. 1, the outlets at the most concentrated end of the network are shown as having a line feed junctor LFJ connected thereto. Sometimes, these devices are also called intra-office trunks. Their function is to furnish talking battery to both calling and called subscribers, to hold the connection during a call, and to release the connection at the end of the call. This particular showing of a line feed junctor is given here by way of example only. It could represent any suitable equipment, such as markers, registers, senders, etc., according to the system needs.

Those skilled in the art will readily understand the symbology of the network 50. Briefly, a matrix having a plurality of coordinate horizontal and vertical multiples (such as 52, 53) are arranged to provide intersecting crosspoints (one of which is shown at 54). One of these multiples (say the horizontals) provides the matrix inlets and the other provides the matrix outlets. A number of these matrices are connected in cascade to complete the switching network. These connections are accomplished via inter-matrix wiring, such as 55. The letters P and S mean primary, secondary.

By an inspection of FIG. 1 and beginning with the vertical 53, a count shows that eight verticals 53, 56, 57, 58, 59, 60, 61, 62 are required to complete any conventional local call. Connections to more distant points may require many more verticals. The dot-dash rectangle 63 might represent a single crossbar switch. Thus, the calling and called subscribers are here shown as located in the same switch and as sharing the same common vertical 53. Nevertheless, according to the prior art switching plan, they are still required to use eight verticals to call each other. They cannot, in fact, both use the common vertical 53 because the common controls for the system are not so arranged.

The excessive crosspoint requirement becomes more apparent when one stops to realize that all crosspoints associated with a busy vertical become unavailable to other calls. Simply put, by way of example, if it is assumed that each vertical has ten associated crosspoints, eighty crosspoints are made unavailable to other calls when a call is completed in a manner depicted by FIG. 1; although, only eight crosspoints are actually used in the switch path. If both subscribers could use the same vertical 53, only ten crosspoints are made unavailable to other calls, and two of them are actually used to complete the path.

Figure 2:
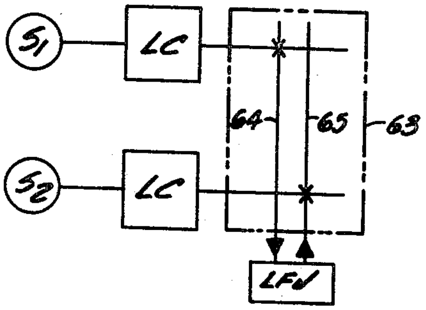

FIG. 2 symbolically shows that if the lines of both the calling and called subscribers and if suitable trunks, such as LFJ, are connected to the same switch 63, and if there are common verticals 64, 65 between the two subscriber lines and their trunk, only two verticals are required to complete a call from a calling line to a line feed junctor LFJ and then to a called line. Even a simple, visual comparison between FIGS. 1 and 2 clearly shows a great saving in crosspoints. If the two subscriber lines are not connected to the same switch (FIG. 3), a single vertical may, nevertheless, still be used to extend the call to outgoing equipment connected to such vertical, such as the trunk circuit $T_{OUT}$.

A traffic study of a larger multi-stage system has shown that if only one vertical is capable of making a single vertical connection between two groups of lines, and if it is always seized first so that it then becomes unavailable to other calls, the percentage of calls (about 15%) completed over a single vertical is very small. If there are two such verticals so that a call between two lines in one group of lines is completed over vertical 64, the vertical 65 is still available for some other call in the same group of lines having access to the same verticals. By the time that a third call occurs in the same group of wires, it is likely that one of the first two calls will have ended. Thus, the percentage of calls which may be completed on a single vertical rises sharply to become approximately 50% (for the same large system traffic pattern) if two verticals having duplicate connections are provided, as shown in FIG. 4. In smaller systems, as high as 80–90% of the calls may be so completed over single verticals.

If the available line and trunk appearances are on different switches 66, 67 (FIG. 5), it is obvious that the call cannot be completed on a single vertical. Instead, the calling line S1 uses the vertical 68 to gain access to a junctor 69 connected to the verticals of all switches. The switch 67 then operates its crosspoints to complete a connection from the selected junctor 69 through the vertical 70 to the called trunk circuit $T_{OUT}$.

A review of FIGS. 1–5 should make it plain that the prior art system (FIG. 1) requires many verticals per call for every call; therefore, many crosspoints are made unavailable to other calls. The invention of the above identified Erwin, Field, Mahood application (FIGS. 2–5 herein) requires fewer crosspoints.

Another consideration for good network design relates to the geometrical arrangement of the crosspoint. While we do not vouch for the accuracy of all details, we believe that a valid understanding may be had from the following general statistics which have been published. For a small number of inlets and outlets, say less than forty, a rectangular matrix contains the fewest number of crosspoints. That is, every inlet has a separate crosspoint switch for connecting it to each one of the outlets. The drawback is that there is no alternate path if any crosspoint goes out of service. The next larger scale, economical size network might have up to, say, four hundred inlets. If it is arranged in three cascaded stages, there will be only about .24 as many crosspoint as there would be in a comparable size rectangular matrix. Moreover, there will be up to nineteen or twenty alternate routes for any call. Thus, a single inoperative crosspoint does not amount to a catastrophic failure. The next large scale, economical size matrix may run up to about eight thousand inlets. If a network this big five cascaded stages, there will be about .035 as many crosspoints as there would be in a comparable size rectangular network. If the network had about one-hundred-twenty-six thousands inlets arranged in seven cascaded stages, there are only about .0045 as many crosspoints as there would be in a comparable size rectangular matrix. The invention provides an efficient network because there are a plurality of alternative paths between each inlet and outlet, arranged to be extended through different numbers of cascaded stages.

The point to be learned from these data is that there may be a substantial crosspoint savings if the geometry of the network is arranged to have a different number of cascaded stages according to the size of the network in terms of the number of network inlets. Moreover, the many alternate paths resulting from the larger number of cascaded stages greatly increases the reliability against the failures which occur if crosspoints fail. The foregoing suggests that there would be a substantial savings if the crosspoint equipment may be arranged to have a variable grouping to use small rectangular types of matrices for completing many calls within a small group of lines with a progressively larger number of cascaded stages to be used for other calls as the network becomes larger. However, this suggestion presupposes that crosspoint minimization is the only consideration. Another factor to be considered during the design of a system is the reliability resulting from an access to alternate routing through a number of cascaded stages. Yet another factor to be considered is the ratio of occupancy of verticals to other equipment, i.e. it does no good to pack traffic so tightly if an excessive number of common control equipments are required. A further factor involves the complexity of the common equipment required to control the network. Still another factor relates to the habits of the system users. Many other factors will readily occur to those skilled in the art.

Accordingly, a good network design usually involves some trade-offs where extra alternative paths are provided to insure reliability and a non-optimum number of stages are used to simplify controls, etc.

Figures 6, 7:
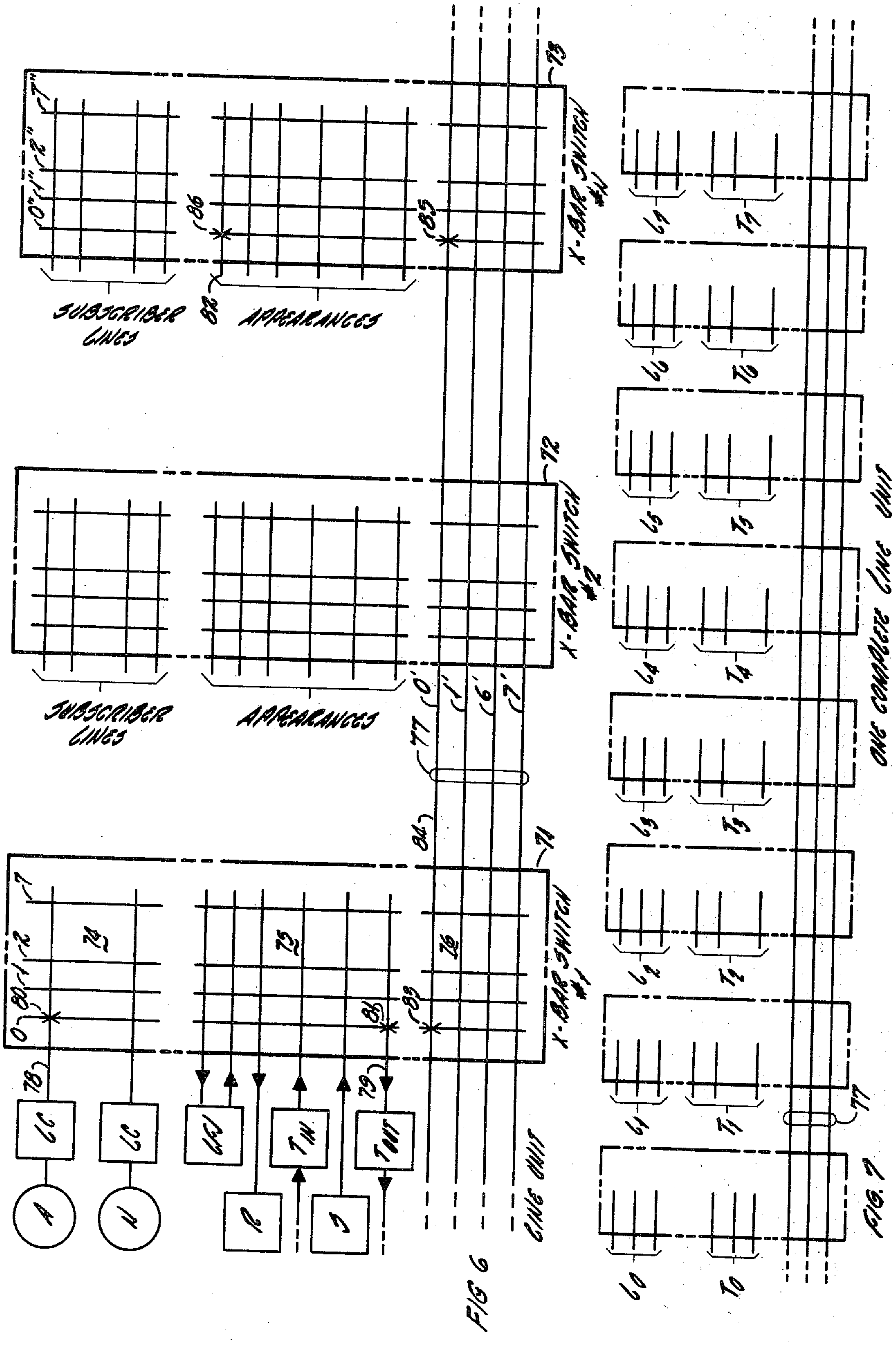
FIG. 6 is a simplified layout of the above identified Erwin et al matrix, which layout is particularly useful for explaining how the system may operate to provide equipment embodying the concepts which are explained by FIGS. 3–5.
FIG. 7 shows how a number of crossbar switches may be joined together to give an economically smooth and uniform network growth for a line unit having up to maximum number of switches which may be so used together efficiently.

FIG. 6 briefly and schematically shows the arrangement of the above identified Erwin et al. system which we believe offers the best comprise in the selection of network parameters. Three exemplary crossbar switches 71–73 (FIG. 6) are wired together to provide a single switching unit which Erwin et al. describe in their co-pending application as a unitary network of crosspoints. Each of these crossbar switches has its verticals cut or split to provide three electrically isolated sections 74, 75, 76. Two sections, 74, 75, provide network entrances and exits (generically called "access points") for switch paths. Of course, there could be any suitable number of such access points. Subscriber lines are connected to the access points in the section 74. Connected to the access points in section 75 may be: incoming, outgoing, tandem, and intra-office trunk lines; register, senders, or the like. The third electrically isolated section 76 of the network includes intra-network wiring 77 (called "junctors") for distributing switch paths across the crossbar switch unit. There is at least one of these wires extending from each crossbar switch to every other switch in the switching unit.

By way of example, if a path is demanded from inlet 78 to outlet 79, the call could be completed via the single vertical including crosspoints 80, 21. On the other hand, if an inlet at access point 78 must be connected to an outlet at access point 82, one possible path extends from point 78 through crosspoints 80, 83 intra-network wiring 84, and crosspoints 85, 86 to exit 82. These two examples are those shown in FIGS. 3 and 5. The drawing shows only a few exemplary paths and crosspoints; it should be understood that there are many other alternative paths.

Viewed in another manner, FIG. 3 shows a connection completed between two access points in a relatively small group of equipments via a single stage network. FIG. 5 shows a connection completed via two cascaded stages. FIG. 7 shows how these principles many be enlarged upon to provide a network of a certain economical scale by joining together eight crossbar switches. Any line in an inlet group $L_0$ . . . $L_7$ may be connected to any line in an outlet group of common equipment "trunk" appearancs $T_0$ . . . $T_7$ in a two-stage arrangement including the junctor wiring 77. For convenience of expression, the complete group of eight switches shown in FIG. 7 is called a line unit.

After the network grows beyond the largest practical economical scale, wherein it is possible to link every switch to every other switch via every junctor wire (as shown in FIG. 7), the inventive system begins to spread its junctors on a more specialized basis in order to provide a larger scale, economical sized network. Thus, the next larger system uses a frame group (as shown in FIG. 8) having up to seven of the line units shown in FIG. 7, or a total of fifty-six crossbar switches. More particularly, the circle 87 (for example) represents the eight switch line unit of FIG. 7. Six other identical line units are shown by similar circles 88, 89, 90, 91, 92, 93 in FIG. 8. If every switch in the frame group were wired together by every junctor as shown in FIG. 7, a junctor used to extend a connection between line units 87, 88 would become unavailable for extending connections between line units 89, 90. Thus, any disruptive effects upon traffic in, say, line unit 90 would be felt as a general degeneration of traffic handling capability in every other line unit 87–93.

To provide a more effective and efficient use of the paths, the junctors 77 are extended in groups to various line units. In greater detail, assume that there are ninety-six junctors in the group 77, FIG. 7. Six equal groups 94, 95, 96, 97, 98, 99 of sixteen junctors each are extended between each of the line units 88–93 as shown in FIG. 8. A simple count of the lines in FIG. 8 discloses that there are twenty-one entirely different groups of sixteen junctors or a total of three hundred and thirty-six possible paths. Those familiar with traffic studies required to make trunk grading patterns will recognize how to distribute these junctors.

After the system grows beyond the econmical scale available from a seven line unit frame group of FIG. 8, still further added capacity may be provided by arranging the junctors and inserting a link stage 100, as shown in FIG. 9A. The numbers 8, 8+8, 16, 64, 80, 96 identify the numbers of junctors appearing at the indicated points in FIG. 9A. The link stage is a switching unit having access to some of the junctor groups which extend between line units, but not to other of these junctor groups. The preferred path between the line units 87 and 89 (for example) is the shortest one 102 which would busy out only one junctor having direct access to only the pertiment line units. However, if there are no idle junctors in this group, a path could be completed from the line unit 87 via a junctor in group 103, link 100, and a junctor in group 104, for example. An inspection of FIG. 9A reveals the other many connections which may be used to increase efficiency.

The pattern of FIGS. 8, 9A are hypothetical arrangements designed to illustrate a principle. In keeping with the above stated principle that calls should go through a progressively greater number of stages as the number of inlets increase, the network may be arranged to have any number of link stages. Therefore, as the number of inlets increase, a progressively greater proportion of the calls are diverted through the link stage, and there comes a size whereafter virtually all calls outside a line unit are diverted through a link stage. Again, following the principles set forth above, the link connections could involve one, two, or more verticales, per connection.

A path through the system of FIG. 9A is shown in FIG. 10 as including the three verticals 106, 107, 108, 109. Thus, it is seen that the call has now been sent through three cascaded stages, thereby tending to obey the above stated principle that the number of cascaded stages should increase as the size of the network increases.

After the network grows to the optimum, economical size frame group (as shown in FIGS. 9A, 10), a number of frame groups may be joined together by link junctors 110. These link junctors are wires running through the link switches in substantially the same manner as junctors 77 run through the line unit switches (FIG. 7). This type of a call is shown conceptually in FIG. 11 where the verticals 111–117 are used to complete the call, in effect, through four cascaded stages. Compare this "worst" case call with the prior art network call (FIG. 1) where every connection (however simple) required four verticals for a line to out trunk connection.

FIGS. 7 and 9A show small and large offices, respectively. For intermediate size offices (in the order of 20,000 to 30,000 lines) a simpler link arrangement is adequate, as shown in FIG. 9B. The junctors 118 coming out of the "LINE UNITS" are brought to link switches at 119 which can connect them together. This type of call is shown in FIG. 10. It might be noted that the verticals 107, 108 may, in fact, be on a single vertical so that a line to trunk connection, anywhere in the network, is accomplished by the use of three verticals. Also, since there are no link junctors in the embodiment of FIG. 9B, the controls are simpler than they are for the embodiment of FIG. 9A.

The economy sought by this invention should now be apparent. However, the economy will be realized only if the common controls required to elect an optional preference does not become so complicated that all savings resulting from crosspoint minimization are soaked up by the controls.

To better understand the nature of these common controls, let us review the tasks which they must perform. For this review, assume that a calling line is generically calling any "trunk" appearance—which could be a register, trunk, line feed junctor, etc. The object is to have the calling line take the path having the highest preference which is then available. To obtain the greatest efficiency, the makers are arranged to select the trunks which permit connections to be established over the shortest available paths. However, the location of a called trunk appearance is sometimes a randomly occurring event which cannot always be closely controlled. Therefore, it is not always wise to make a great effort to exercise preference control over the terminate switch path from a trunk appearance to the called line. The decision of how to route a terminate path is, therefore, one which is to be considered when a system is designed.

The alternatives described below are that the calling line and trunk appearances may be:

(1) On the same switch (FIG. 2);
(2) On different switches in the same line unit (FIG. 5);
(3) In different line units within a frame group with link switching required (FIGS. 9B and 10); and
(4) In different frame groups with link switching required FIGS. 9A and 10).

The channel selector will exercise a correct preference if it is able to select the first and shortest available path, selection being made in the numerical order listed above.

To illustrate how a preference selection is made, consider the second preference optional path which is shown in FIG. 5. In the description of FIG. 6, it has been assumed that such a path was completed by using crosspoints 80, 83, 85, 86 (which are parts of the verticals 0 and 1 on switches 71 and 73) and junctor 84. This same path has been redrawn in FIG. 12, a different version of FIG. 6 designed to show all possible paths between line A and trunk 82. The reader should be able to orient the two drawings by comparing reference numerals.

In FIG. 12, the line A has access to eight verticals numbered 0–7 here and at the top of switch 71 in FIG. 6. The trunk 82 has access to the eight verticals numbered 0–7 here and at the top of switch 73 in FIG. 6. Each of the verticals are arranged to "see" a certain group of the junctors 77 depending upon how the junctor wires are connected to the crosspoints. Therefore, FIG. 12 has been drawn to indicate that each of the verticals 0, 1, 0″, 1″ can see junctor 0′. Verticals 2, 3, 2″, 3″ can see junctor 2′, etc. This is, of course, a highly simplified one of many possible matrix patterns presented here by way of example only. By looking at FIG. 12, it becomes apparent that an idle channel may be selected by testing the junctor and the equipment connected to each of its ends for idle conditions. Restated in another manner, by way of example, if junctor 0, vertical 0, and vertical 1" test idle, that is an available channel which may be used to connect line A and trunk 82. In a similar manner, any other of the disclosed channels may be tested and selected.

FIG. 15 et seq. of the above identified co-pending Erwin, Field, Mahood application include a table which discloses one exemplary pattern showing the connections in a crossbar switch matrix by means of which many paths can be selected in different operating modes. FIGS. 13, 14 herein show another somewhat similar pattern which is reproduced here to facilitate a description of this invention. Still other patterns could be drawn by those skilled in the art. FIGS. 13 and 14 represent eight crossbar switches here designated Switch 0, Switch 1 . . . Switch 7. Each switch has its verticals cut (as at 120, 121) to provide three electrically isolated sections of cross-points (as at 122, 123, 124). The equipments connected to the switch are identified at 125. Thus, for example, the uppermost horizontal of each switch is connected to registers; the second from uppermost is connected to senders; the third to trunks. These are the connections generically called trunks herein. An inspection of the drawing identifies where the remaining equipment is connected.

The verticals are identified at the top of each switch (as at 126). The last digit in each vertical identification number indicates one of the eight verticals 0–7 which also appear in FIGS. 6 and 12. The first or first two digits in each vertical identification number identify the line group. Thus, if the first group of eight verticals 0–7 are in line group 0, the verticals are identified 00, 01, . . . 07. The second group of eight verticals 0–7 are in line group 1 and are identified 10, 11, . . . 17. An inspection of the drawing will disclose how the remaining verticals are identified.

These figures are drawn with rectangles which contain numbers identifying the equipments connected to the crosspoints. Thus, block 127 indicates that register 0 is connected to the crosspoints of the verticals 00, 01 at the uppermost select bar. Other blocks show that register 0 is also connected, as a trunk, to the crosspoints of verticals 14, 15, 26, 27, 32, 33 at the uppermost select bar of various switches—and, as a line, in block 128. This way, the register may either seize or be seized by other equipment. An inspection of these figures will tell the reader where all other equipment is connected into the crossbar matrix.

The junctors in section 124 are also identified by numbers in the blocks where they are connected. Thus, block 129 shows that junctors 0–1 are connected to the crosspoints at the last four select bars in verticals 00, 01. Each junctor number here represents a group of six three-wire junctors. Thus, over either of the verticals 00, 01, a line 000 may seize any one of thirty-six wires, eighteen of which are in each of the junctor group 0 or 1. In like manner, the same line 000 may seize a wire in either of the junctor groups 2 or 3 over either of the verticals 02, 03. The junctors allow the lines to reach a point of access in appearances group 122 via a number of alternative paths. For example, line 000 may use verticals 03 and 14 to complete a connection via junctor 3 to trunk 00. This is similar to the path shown by FIG. 5 except that it is completed within a single switch. If two switches were involved, the path might have included verticals 04, 26 and the junctor 5. The single vertical optional connection (FIG. 3) between line 000 and trunk 00 could have been completed via either of the verticals 00 or 01.

It should be noted that the matrix is laid out in four basic line patterns and four basic trunk patterns, as indicated at 130, 131, respectively. For example, on switches 0 and 1, trunk group 00/99 is called trunk pattern 0 and it appears on verticals 00, 01, 14, 15, 26, 27, 32, 33. The line pattern 0 includes all lines associated with trunk patterns 0, 1, 2, 3; line pattern 1 includes all lines associated with trunk pattern 2, 3, 0, 1, etc.

The junctor patterns are different for each combination of line and trunk patterns. In greater detail, each block in section 124 contains numerals identifying junctor groups by an even number and an odd number. In every junctor pattern, the even numbered junctors follow the same order 0, 2, 4, 6. However, the odd number junctors change with each line pattern, i.e. they are arranged 1, 3, 5, 7 in line pattern 0, 7, 5, 3, 1 in line pattern 1, etc. Also, the trunk assignments change from line pattern to line pattern so that every trunk sees every junctor and every line may reach every trunk via every junctor. By way of example, line 000 may reach trunk 00 via junctors 0, 1 in line pattern 0; junctors 4, 3 in line pattern 1, junctors 6, 5 in line pattern 2; and junctors 2, 7 in line pattern 3. Of course, junctors 0, 1 are not necessary in this example because they are on the verticals where a single vertical call is possible, i.e. the call would come into the block 132, run up vertical 00 or 01 and go out the block 133. From a study of FIGS. 13, 14, it will be seen that the same patterns are repeated in every switch.

The remaining figures show an exemplary, preferred embodiment of the invention, incorporating the inventive concepts set forth above.

In these figures, the relay designations have the following means:

CHK, CK=Check
CHL=Channel link
CHLA=One vertical call can be completed
CHT=Trunk channel test
FH=First half
FM=Failure to match
HTR=Heavy traffic
JG=Junctor group
K=Link switch required
LA=Link junctor availability
LCH=Select channel
LFG=Line frame group
LJ=Link junctor
$LJ_e$=Link junctor (line end)
$LJ_t$=Link junctor (trunk end)
LK=Link channel test
LKT=Link channel busy
LP=Line pattern
LUA=Line unit
LV=Line vertical
LVT=Line vertical test
ON=Off normal
ONC=Off normal channel
PFG=Preferred group
PU=Preferred unit
PUG=Preferred unit gate
RCY=Recycle
RTT=Class of call
S=Stepping chain
SCS=Start channel selection
SEL. MAG.=Select magnet
SF=Same frame group
SH=Second half
SOK=Sleeve OK
SU=Select unit
SVP=Single vertical call possible
TA=Trunk junctor availability
TCH=Trunk channel select
TFG=Trunk frame group
TG=Trunk group
TP=Trunk pattern
TUA=Trunk unit
TV=Trunk vertical
TVT=Trunk vertical test
UB=Unit busy
UR=Unit relay
UT=Unit trunk
VG=Vertical group
2F=Two frame groups required 1LK=One link switch required
2LK=Two link switches required
1V=One vertical call
2V=Two vertical call Each relay and its contacts are designated by the same alphabetical representations, e.g. contacts LV1 are on relay LV1. All contatcts are shown in their normal position.

Since the remaining drawings include only well known components, such as relays and their contacts, it is thought that the nature of the invention will be understood best by a description of how exemplary calls are set up. Any one of a great number of calls could be described; however, they will all follow essentially the same pattern for any given mode of operation. Therefore, it is thought that the principles will be understood by those skilled in the art if an exemplary call is traced for each mode of operation.

When the calling subscribed station A goes off-hook, the marker identifies the calling line by well known techniques. The marker then causes the appropriate line vertical or LV relay to operate. When the line vertical relay LV operates, contacts 135 (FIG. 15) close. In doing so, the well known sleeve leads of the eight verticals 0–7 available to line A are switched through. If, for example, line A is the line 000 (FIG. 13), the sleeves are associated with the verticals 00, 01, 02, 03, 04, 05, 06, 07. If line A were the line 010, the sleeve leads would be associated with the verticals 10, 11, 12, 13, 14, 15, 16, 17, and another LV relay would operate contacts (not shown, but similar to 135) to connect the sleeve leads of those verticals to the common multiple points 136. In like manner, any group of eight verticals seen in FIGS. 13, 14 may be connected to the multiple points 136 by the operation of an individually associated one of eight LV relays.

A line unit connector relay individual to the eight switches of FIGS. 13, 14 operates the contacts 137 to further extend these eight sleeve leads into the marker 138. If the line were in any other line unit, some other connector relay would close contacts similar to 137 to connect the sleeve leads from that line unit into the marker. Busy or idle potential markings on the sleeve leads then operate the "line vertical identification" relays LVT in the marker.

According to the invention, the circuit of FIG. 16 selects a preferred mode of operation depending upon the type of call which is being made. In greater detail, by the technique disclosed in FIG. 15, the marker equipment knows the exact location of the line with respect to other equipment in the office. The location of the trunk is known from the directory number digital information sent by the calling subscriber, or by the control equipment itself, as when a call is being extended to a register, for example. In any event, these locations may be translated by any known means into selected relay operations. A line location translation results in the operation of a line frame group relay LFG and the line unit relay LUA representing the frame group and line unit where the line is connected. Likewise, a translation of the trunk location results in the operation of a trunk frame group relay TFG and a line unit relay TUA. For example, if a line is connected to the second line unit in the fourth frame group, LUA2 and LFG4 operate and contacts 141, 142 close. Or, if the trunk is connected in the fourth line unit in the second frame group, for example, contacts designated LUA4 and LFG2 close.

At the time when the office equipment is originally installed or thereafter enlarged, a strap 143 is connected from terminal F to one of the terminals A, B, or C, depending upon the size of the office. In an office (FIG. 8) which does not require a link switch, only the equipment 144 (FIG. 16) is required, and the terminals A–F are strapped together at 143. In a slightly larger office (FIGS. 9B, 10), one link switch is required, and equipments 144, 145 are provided. The strap 143 is connected between terminals F–B. In a large office (FIGS. 9A, 11), two link switches are required, and equipments 144, 145, 146 are provided. The strap is then connected between terminals F–C. It is assumed for present purposes that the office is a large one and that the strap 143 is connected between terminals F–C. This option includes the other two options.

The circuit of FIG. 16 operates this way. The contacts 147 operate to start a channel selection process. Therefore, a ground potential is applied to point 148 with the assumed strapping F–C. If the trunk and line are in the same frame group, the ground potential appears at point 149. For example, if both trunk and line are in frame group 0, the path between points 148, 149 is completed via operated contacts 150, 151. If both are in frame group 1, the path is via operated contacts 152, 153. On the other hand, if the trunk is in the second frame group and the line is in the zero frame group, for example, contacts 154 and 150 are operated. Then, a path is completed through the contacts 151, 153, 155, TFG3, and TFG4 the winding of relay 2LK and then to battery. The operation of relay 2LK prepares the system for a two link switch call, as shown in FIG. 11.

Assuming that the line and the trunk are in the same frame group, the next question for the equipment to decide is whether a link switch will or will not be required. For example, if the assignments are such that one link switch is required when the line is in line unit 4 and the trunk is in trunk unit 0, relay 1LK operates over a path including contacts 156, 157. Or, if the assignments are line unit 5 and trunk unit 1, the one link relay 1LK operates over a path including contacts LUA5 and TUA1. On the other hand, if (for example) both the trunk and the line are in the same line unit 0, contacts 157, 158, 159, 160 operate. This time, the ground at point 149 is applied through contacts 157, 156, a series of unoperated TUA contacts, contacts 160, 159 and the winding of relay SF to battery. By inspection, it will be obvious how the relay SF operates any time when the line and trunk are in the same line unit.

A simple three relay circuit, shown near the top of FIG. 16, explains how the operations of the contact matrices 144, 145, 146 are interpreted. Off-normal contacts $ONC_3$ close if there is a demand for a switch path. If no link switching is required, the contacts $1LK_1$, $2LK_1$ are down. Relay LCHA (FIG. 24) is operated if a one vertical call is indicated, thus completing a path to the one vertical relay 1V (FIG. 16). If a one vertical call is not indicated, relay LCHA is released, and the two vertical relay 2V operates. If the contact matrices 144–146 indicate that a link stage is required, either the 1LK or 2LK relay operates to close a circuit to relay K.

If the strap is connected between terminals F–A or F–B, the relay 2F operates when the contact matrices 144, 145 indicate that two frame groups are required. Again, it should be recalled that the general principle is that switching systems should go through a progressively greater number of stages as the total size of the system increases. Therefore, one would expect that the total system will be designed so that a much higher percentage of the calls will go via the link stage in a large system. Conversely, in a small system a much higher percentage of the calls will go via a single vertical.

From FIGS. 13, 14, it should be apparent that the information data giving the identity of the coordinates of a set of crosspoints may be translated into an identification of either the crosspoint itself or the line or trunk pattern in which the crosspoint is located. Thus, for example, if a crosspoint's coordinates are defined by contacts associated with the vertical 00 and the uppermost select bar in an operated condition, the crosspoint is located in block 127 (FIG. 13), and it belongs in trunk pattern 0. Likewise, coordinates defined by contacts associated with the vertical 00 and the fifth select bar represent a crosspoint located in the block 132 belonging in the line pattern 0.

FIG. 17 shows the circuit which is used to read out a translation of these coordinates in terms of line and trunk patterns. In greater detail, the dot-dashed oval 161 encloses a symbol designated $V^{0,4}$ which represents the coordinates of eight crosspoints on verticals 00, 01, 02, 03, 04, 05, 06, 07 (in this example) which crosspoints are assigned to the line 000. The contacts $V^{0,4}$ are part of any well known translator operated responsive to contact operational conditions of the type disclosed in FIG. 15. Under off-normal conditions, indicated by a closure of the contacts ONC, a line pattern relay LP0 operates responsive to this closure of the coordinate contacts $V^{0,4}$. Contacts controlled by the relay LP0 are coupled into any other circuits in the channel selector which may require the specific information that the pertinent contact is in line pattern 0.

In a similar manner, the dot-dashed oval 162 indicates coordinate contacts which identify the group of crosspoints where a trunk connection is made (i.e. a trunk pattern). The contacts RTT are operated by any suitable means for indicating the class of a call. If contacts RTT5 are operated from the position disclosed in the drawing, the pertinent coordinate contacts 163 are those of a specific trunk as distinguished from those of a group of trunks. In either event, the contacts 162 or 163 operate relay TP0 during off normal conditions to indicate that the pertinent trunk is in trunk pattern 0. From a study of FIG. 17, it should be apparent that any one of the line or trunk pattern relays LP or TP may be operated to identify the line or trunk pattern respectively.

The crosspoint coordinates are also used to determine whether a single vertical call is possible. For example, it should be apparent from FIG. 13 that it is only possible to complete a single vertical call from line 000 to trunk 00 via the verticals 00, 01. Obviously, this is possible only because the line and trunk are connected to the same vertical on the same switch, in the same line unit, and on the same frame group.

In FIG. 18, the line and trunk identifications are made by a selective closure of the two sets of coordinate contacts 164 and 165, respectively. Each set of these coordinate contacts identifies a vertical and a crosspoint on a vertical. For example, in FIG. 13, contacts designating vertical 00 and line 000 would indicate a crosspoint where line 000 is connected to vertical 00 while contacts 00 and 005 would indicate another set of crosspoints serving line 005. One of these two crosspoints is selected, depending upon whether the associated select bar rocks clockwise or counterclockwise. In FIG. 18, the contacts 166, for example, represents the 0 vertical and contact 167 represents the described 000 line. Thus, when contacts 166, 167 (for example) close, relay SH operates and closes contacts 168. This extends a path from ground at contacts 166 through contacts 167, 168 to the trunk coordinate contacts 165. If the line and trunk are connected to the same switch in a manner which enables the completion of a single vertical call, the coordinate contacts 165 are operated to extend ground over a path through contacts 166, 167, 168, 165, contacts on relay RTT, and the single frame SF relay contacts 169 to a single vertical possible relay SVP—which operates. Contacts 169 are closed by relay SF (FIG. 16) if the line and trunk are in the same unit.

A brief review of the description of FIG. 18 makes it apparent that the ground from contacts 166 reaches the relay SVP only if the line and trunk are on the same switch in the same frame group and if the class of call is one which should be completed on a single vertical. Therefore, the operation of relay SVP indicates that the channel selector should attempt to complete a single vertical call. After the various relays described above have completed their functions, the chain of contacts shown near the bottom of FIG. 18 operate in a manner which operates the relay SCS to start the channel selection.

DESCRIPTION OF EXEMPLARY CALLS

The events which are about to be described will follow a sequence disclosed in FIG. 19. In this chart, the *x* marks indicate the occurrence of an event, and the lines indicate the causal connection between the events which are so indicated. These events occur in successive time periods, here designated T1, T2, . . . T7. No special significance or system timing is to be inferred from these time sequence designations which are adopted here solely for convenience of expression. The durations of the time periods T1, T2 . . . may be either equal or unequal, as required. Also, FIG. 19 is arranged to describe the completion of the most simple call shown by FIG. 3 and of the most complex call shown in FIG. 11. The simple call will be described first.

During the first time period T1, a line vertical relay LV associated with the calling line group verticals operates to close contacts similar to contacts 135, FIG. 15. On the trunk end of the connection, a trunk group relay TG operates to close contacts also similar to contacts 135. In the available junctor group, a relay JG operates also to close contacts similar to 135. All of these relays perform functions for helping to identify the matrix coordinates of crosspoints which are closed or are busy. The various circuits are further connected to the marker by an operation of various connector contacts, such as contacts 137 in FIG. 15.

During the second time period T2, various test relays (LVT, TVT, CHL) either do or do not operate according to whether the associated verticals are busy or idle. Also, the start channel selection relay SCS operates to begin the actual channel selection process.

During the time T3, a sleeve OK relay SOK operates if there is a sleeve continuity from the line to the line test relay LVT. Operation of relay SOK tells the equipment that the circuit extending back to the subscriber line has been completed and is being held in a satisfactory manner.

During the time T4, a line channel relay LCH operates to select a particular one of the channels which has been tested and found to be idle and available by an unoperated condition of a combination of LVT, TVT and CHL relays. It may be recalled that this is the criteria for channel selection depicted by FIG. 12. That is, a channel is idle and available when the channel and the equipment connected to each end of the channel is also idle and available (relays CHL, LVT, and TVT operate).

During the time T5, the relays LV and TV operate to mark the channel which is about to be selected and to make it busy to other calls.

During the time period T6, a check relay CHK operates for both line and trunk if the various relays have assumed the proper operated or unoperated conditions which indicate that all segments of the desired route are available and have been selected.

During the time period T7, the select magnets operate if the check relays CHK have operated.

An exemplary circuit for finding and selecting the line unit and switch capable of making a one vertical call will become more apparent from a study of FIG. 20. From FIGS. 15, 16, and 17, it should be obvious that any connections made to a line or other "trunk" appearance are automatically identified to the marker, or other equipment, according to the combination of operated magnets, relays, cannectors, and the like. This identification is used to prefer the line unit and frame group containing the single switch that is capable of making a one vertical call.

Means are provided for preferring the line unit containing the operated crosspoint associated with a calling line. This means uses the equipment location coordinates read-out to the marker from the various relays, as taught by FIG. 15. These coordinates are then decoded in any suitable manner to operate a unit relay UR individual to the line unit containing the operated crosspoint. For example, if the calling line is connected to a line unit 0, the unit relay $UR^0$ operates. Parenthetically, the circuits use a code involving the numbers 0, 1, 2 and 4. The relay operations always include either one or three operated relays representing digits the sum of which is the desired number, as follows:

| Number: | Relay operated |
|---|---|
| 0 | 0 |
| 1 | 1 |
| 2 | 2 |
| 3 | 0, 1, 2 |
| 4 | 4 |
| 5 | 0, 1, 4 |
| 6 | 0, 2, 4 |
| 7 | 1, 2, 4 |

If, as assumed, the operated crosspoint is in line unit 0, the register operates relay $UR^0$, and ground appears at point 170 in FIG. 20. If the assumption had been that the operated crosspoint appears in line unit 1, for example, relay $UR^1$ operates, and the ground potential appears at the point 171. If the crosspoint appears in line unit 7, for example, relays $UR^1$, $UR^2$, and $UR^4$ operate (note that $1+2+4=7$), and ground appears at point 172. An inspection of FIG. 20 explains how any one of eight units may be identified.

Whenever any cricuit is demanding service, there is an off normal condition which closes an off normal contact ON. Furthermore, if such a demand is made during day time, a heavy traffic relay HTR (not shown) operates contacts HTR, and a path is closed to operate a preferred unit gate relay PUG. Responsive thereto, all of the PUG contacts close, and a single one of the preferred unit relays PU operates. For example, if the operated crosspoint of the line demanding service is in unit 0, relays $UR^0$ and PUG close a path to operate relay PUO.

Means are provided for distributing calls in a random manner when the first preference is unavailable or during periods of light traffic. More particularly, the chain of contacts S0–S7 are operated in a one-at-a-time sequence by any device adapted to take periodic steps. For example, these contacts could be the terminals on the bank of a simple stepping switch driven by a timer, or contacts on a similarly driven chain of counting relays. If the preferred unit is busy or otherwise unavailable when the PU relay operates, or if it is during a period of light traffic while relay HTR is not operated, a ground is fed through off normal contacts ON to the contacts S0–S7 instead of through the contacts of the relay PUG. In the preferred unit busy situation, this same ground is fed through contacts on a second trial relay 2TR. When the PUG relay releases responsive to operation of the 2TR contacts, the PUG contacts open to break the circuit selected by one or three of the operated relays UR. Then a circuit is completed through any randomly operated one of the contacts S0–S7 to pick a line unit at random. If that line unit is busy or otherwise unavailable, a recycle relay operates to close contacts RCY. By now, the chain of contacts S0–S7 will have taken at least one additional step, and another unit will be picked, also at random. In theory, the two contacts 2TR and RCY could be part of an endless chain circuit, and the line units could be selected endlessly until a successful connection has been made. In actual practice, however, it has been found that, in one particular system, a desired grade of service results if there are only two attempts to make a line unit selection.

Briefly, the HTR relay releases whenever the number of calls fails to exceed a given volume per unit of time. For example, in the middle of the night, calls may be spaced apart by more than a predetermined period of time, such as three seconds. If so, heavy traffic relay HTR releases, and the off normal ground feeds through contacts HTR to the contact chain S0–S7. This completely eliminates the preferential line unit selection since it is not required during periods of such light traffic conditions. The reason for this type of operation is that it insures a random unit selection so that a calling subscriber does not always reach the same equipment. Otherwise a calling subscriber would always reach the same line unit, and if it should be faulty he might be barred from making any further phone calls. During day time, the normal traffic distribution will prevent such a faulty reuse of equipment.

FIG. 21 shows how the line unit preference identification made by FIG. 20 is transformed into an actual unit selection. From FIG. 20, one of the PU relays is operated responsive to either the operation of identification relays UR, or a random selection by the stepping chain of contacts S0–S7. The operated PU relay controls a particular set of contacts in the group of contacts 175. For example, if the relay PUO has operated, the contacts 176, 177 are operated. Likewise, if the relay PU1 operates, the contacts 178, 179 operate, etc. If the preferred line unit is busy, the marker receives a busy signal from any suitable means, such as the various line vertical relays which are shown in FIG. 15. A busy condition in the preferred line unit results in an operation of contacts 180, for example. This, in turn, results in a transfer of the preference selection from the preferred line unit to some other line unit. Here, the contacts 181 close to transfer the selection to line unit "5" via a circuit including the operated contacts 180.

By reference to FIGS. 13, 14, it may be recalled that the trunks are grouped together. Thus, for example, the lowermost blocks in section 122 represent the trunk groups 00 to 09, 10 to 19, etc. The service demanded or the number dialed by the calling subscriber tells the common control equipment that a connection should be completed to a particular one of these trunk groups. If a trunk in the requested trunk group is available and idle, a relay (such as $UT^{00}$ not shown) operates to close $UT^{00}$ contacts 182. If, for example, the request had been for a trunk in the trunk group 01 and if it were idle, the contacts 183 would now be closed. In like manner, corresponding contacts close for any of the trunk groups which are indicated in the drawing by the associated reference character.

The circuit of FIG. 21 operates this way. A subscriber station goes off-hook and causes a set of start contacts 184 to close. A frame group relay operates to close contacts 186 and thereby identify the frame group containing the line serving the subscriber who is demanding service. The ground sent through contacts 184, 186 is applied through the operated preferred unit contacts (such as 177) and contacts 180 if the preferred unit is idle, and then through contacts 182 if a trunk is available in the demanded group $UT^{00}$, and the winding of SU00 to battery. The resulting operation of relay SU00 selects the line unit that is able to complete a one vertical call. The ground from contacts 184 also appears on conductor 189 for any suitable purpose, such as recording trouble from contacts 184, for example. The preliminary or *x* contacts 190 on relay SU00 close a locking circuit via checking contacts CK1 before any other contacts of this SU relay may operate. The other SU00 contacts open to prevent any other of the SU relays from locking in an operated condition.

If the preferred line unit is not available or if it does not contain a demanded trunk, the call is transferred to select another line unit. More particularly, contacts (such as 180 and 181) transfer the demand to another unit. If all line units in the frame group are busy or do not contain idle trunks, the start ground is then sent over one or more of the conductors 191*a*, 191*b*, or 191*c* to the select unit of another frame group where the call will be completed by equipment 194 which is identical, for descriptive purposes, to that enclosed in the dashed line rectangle 195. The drawing shows that there are, in fact, five such identical equipments which allows the system to utilize up to five frame groups, in this case.

Figures 23, 23B:
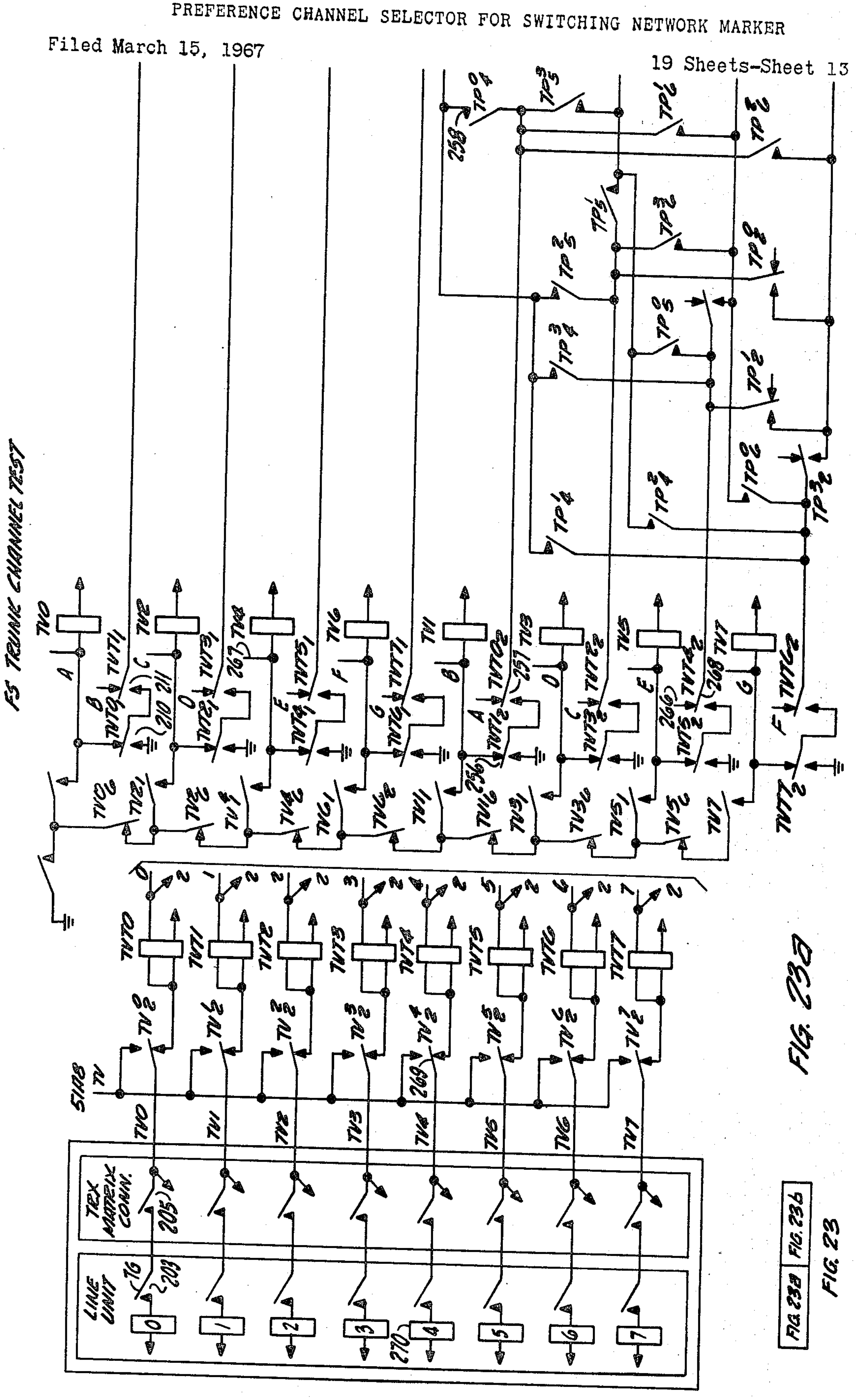
Figures 23, 23B:
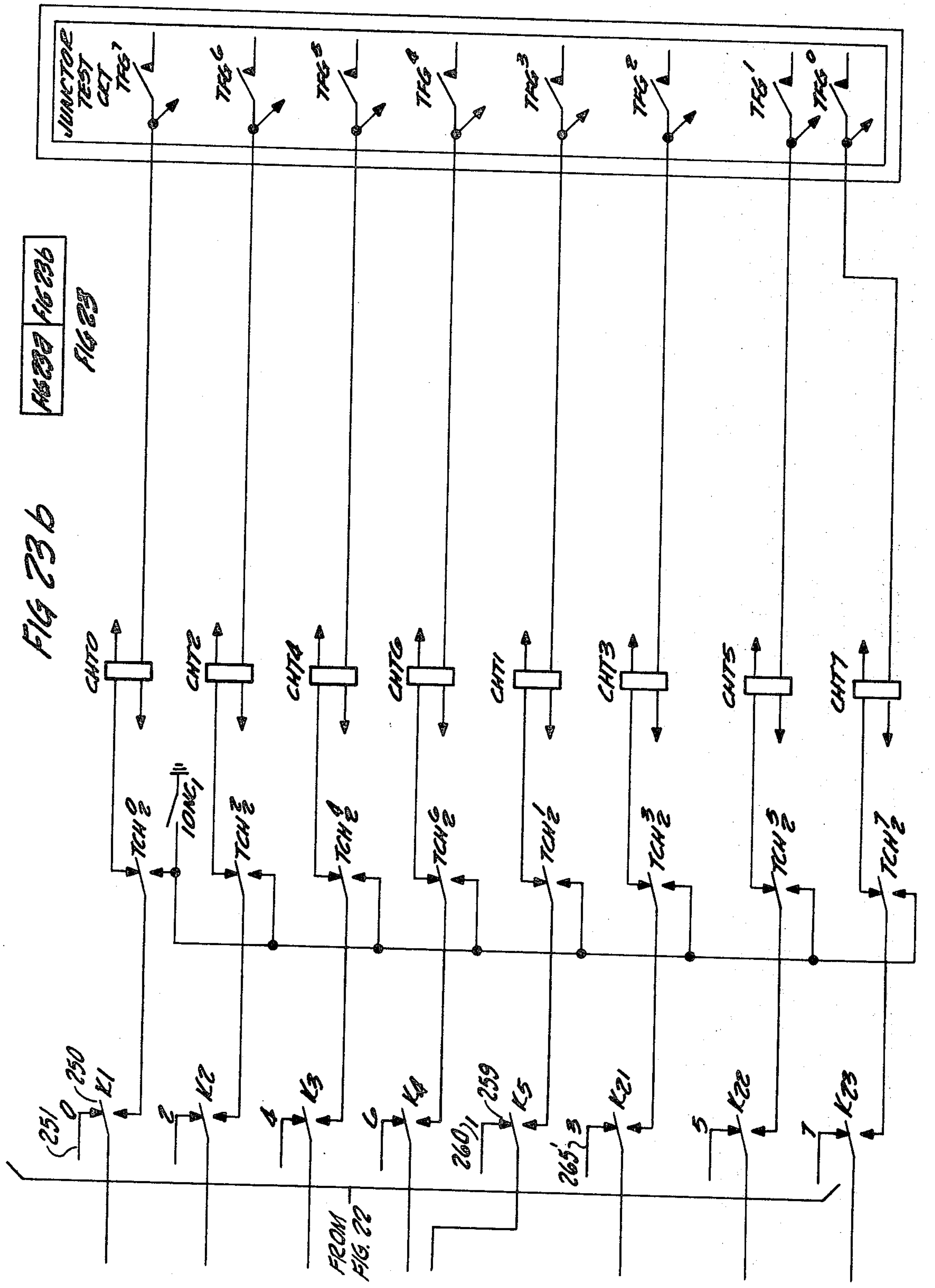

Thus far in this description, the connection has arrived at the line unit and frame group which were selected because they contain both the line and trunk appearances. The next step in the selection process is to select the single vertical which may be used to complete the connection, if it is available. If it is not available, the system should operate in the mode having the next highest preference. FIGS. 22, 23 show the test circuits for ascertaining the availability of this preference selection. FIG. 22 shows the channel selection test equipment in the marker, which equipment is associated with the lines (section 123, FIG. 13), and FIG. 23 shows the channel selection test equipment associated with the trunks (section 122, FIG. 13).

The left-hand sides of FIGS. 22 and 23 shows essentially the same equipment that is shown in FIG. 15. The hold magnets on the crossbar switches appear inside a box marked Line Unit. If a vertical is busy, the associated hold magnet is held operated by a ground potential applied to the right-hand side of its winding via any suitable contacts, such as contacts 200, for example. If the hold magnet is idle and available for use, the right-hand side of its winding is standing at the battery potential indicated by an arrow head, such as 201. All other hold magnets are also coupled (not shown) in the same manner to battery and to busy ground, when busy. A number of wires are shown to the immediate left of relays TV0–TV7 and marked A–G. The two wires A, A are connected together as are B, B; C, C; D, D; etc. This disclosure is used to avoid cluttering the drawing.

When a connection is requested, a vertical group relay VG (not shown) operating vertical contacts such as 202 in FIG. 22*a*; or , a similar trunk group relay TG operates contacts such as 203 in FIG. 23. The line unit connector or trunk unit connector then closes contacts 204 or 205, respectively. The hold magnets are now connected to the line vertical test relays LVT (FIG. 22), and the trunk vertical test relays TVT (FIG. 23). If the busy contacts, such as 200, are operated, a ground potential is present to operate the vertical test relay, such as LVT0 or TVT0. Of course, these relays are cited as examples only Any busy verticals will cause the corresponding vertical test relays to operate.

If the demanding line and requested trunk appearances are in the same switch, it is possible for a call to be completed via a single vertical; therefore, the relay SVP (single vertical possible) operates, as explained by FIG. 18. FIGS. 13 and 14 explain the patterns in which the equipments are connected when the connections are made to the crosspoints in the crossbar switch, and FIG. 17 explains how the pattern is translated into certain relay operations. For example, if a line is wired in an 0 line pattern, it causes a line pattern relay LP0 to operate; if it is in the pattern 1, it causes a relay LP1 to operate, etc. Likewise, the trunks are also arranged to cause a trunk pattern relay TP0, TP1, etc., to operate, according to whether they appear in the trunk patterns 0, 1, etc. By way of example, a study of FIG. 13 makes it apparent that a single vertical call is possible on either of the verticals 00 or 01 if both line and trunk are in their respectively 0 patterns, on either of the verticals 02 or 03 if in line pattern 0, trunk pattern 1, etc.

Single vertical call

It may be assumed that vertical 00 is busy so that contacts 200 (FIG. 22) are closed to operate relay LVT0 and thereby indicate the busy condition. This means that vertical 00 cannot be used to complete a single vertical call between a line and a trunk in the 0 line and trunk patterns, repectively. However, it is also assumed that vertical 1 is idle. Thus, the potential of battery 206 is present and the relay LVT1 is not operated, thus indicating a vertical 01 availability. It is the available single vertical, and according to the preference pattern, it should now be used to complete a call from a line in line pattern 0 to a trunk in trunk pattern 0.

Means are provided for indicating whether a single vertical call may or may not, in fact, be completed. In greater detail, with test relay LVT0 operated, and test relay LVT1 released, contacts 208 are operated from the position and contacts 209 are in the position shown in FIG. 22. Also, the line pattern 0 and trunk pattern 0 relays $LP^0$, $TP^0$ are operated, see FIG. 17. Since contacts 209 are not operated, there is no path from ground through contacts 208, 209, $LP^0$, $TP^0$, $SVP_5$, $LCHA_2$, and the winding of relay CHLA to battery. Relay CHLA does not operate, thus indicating that a single vertical call can be completed. If it had been assumed that vertical 01 is busy and vertical 00 is idle, test relay LVT1 would now be operated, and test relay LVT0 would now be released. Then, the path to relay CHLA would be open at contacts 208 instead of at contacts 209. Again relay CHLA would not operate, thus indicating that a single vertical call is possible. However, if both of the single vertical call possibilities (00 and 01) are busy, the ground at contacts 208 feeds out through contacts 209, $LP^0{}_5$, $TP^0{}_3$, $SVP_5$, $LCHA_2$ and the winding of relay CHLA, which operates to indicate that the preferred one vertical mode of operation cannot be used.

On the trunk side of the matrix (FIG. 23) the operation is essentially the same. If the vertical 00 is busy, test relay TVT0 operates. If the vertical 01 is busy, the test relay TVT1 operates. Responsive thereto, contacts 210 operate if vertical 0 is busy; or contacts 211 operate if vertical 01 is busy. Again, ground does not feed out if either of the single vertical call possibilities are available. Or, conversely stated, if both of the verticals 00 and 01 are busy, the ground potential does feed out to prevent the attempt to complete a single vertical call.

The channel selection circuit is shown in FIG. 24. Again, the line 0 pattern relay operates contacts $LP^0$, and the 0 trunk pattern relay operates contacts $TP^0$. By inspection of FIG. 24, it is seen that a path exists from ground 212 through the combination of line and trunk pattern relay contacts to point 213 when contacts $LP^0$ and $TP^0$ are operated. This is part of a self-checking circuit for indicating that the previously described circuits have operated correctly in that two and only two of the pattern relays have, in fact, operated. continuing with the self-checking circuit and beginning at the point 213, contacts CHK are closed if a selected channel is available for seizure. Contacts K operate only if a link is required to complete a call, (see FIG. 16). Contacts SVP are operated if it is possible to complete a single vertical call. Contacts $CHLA_1$ are not operated if either of the single verticals is idle, for reasons explained during the description of FIG. 22.

If the preceding paragraph is reviewed, it will be apparent that ground 212 is applied to operate relay LCHA if: (1) only one line pattern and only one trunk pattern relay have operated, (2) the channel checks okay, (3) a single vertical call is possible, and (4) relay CHLA has not operated, thereby indicating that at least one of the single verticals is idle.

As soon as relay LCHA operates, its "X" or preliminary contacts 214 close to lock it operated to a ground potential 215 applied through contacts of the channel checking relay CHK. Contacts 216 open to prevent any of the other LCH relays from locking. Of course, none of the other LCH relays should operate since relay CHLA has not operated and contacts $CHLA_1$ are not operated.

The assumption is that there is an off normal condition caused by a calling line demanding a channel; hence, both of the contacts 220, 221 (FIG. 22*b*) are closed. With the assumption that vertical 00 is busy and vertical 01 is idle, it becomes apparent relay LVT0 and its contacts 208 are operated while relay LVT1 and its contacts 209 are unoperated. Also, with relay LCHA operated, contacts 222 are operated. Thus, a path may now be traced from ground through operated contacts 221, 222, $SVP_5$, $TO^0_3$, $LP^0_5$, 209 (unoperated), and the winding of relay LV1 to battery. Relay LV1 operates and locks to ground at its "X" or preliminary contacts 223. Relay LV1 also operates its contacts 224 to pull magnet 225 and thereby select the idle vertical 1. Under the foregoing assumptions, this is the vertical 01 seen in FIG. 13 which may be used to complete a single vertical call from line 000 to trunk 00.

The off normal ground is also applied through contacts 221, 222, $SVP_5$, $TP_3{}^0$, $LP_5{}^0$, $CH_2{}^0$, an isolating diode 226 and the winding of channel selecting relay CHL0 to battery. Relay CHL0 operates to busy mark channel "0" immediately so that it will not be seized by another marker.

The foregoing explains in detail how one exemplary single vertical call may be completed. Perhaps it would be well to briefly explain the selection of a few other single verticals. Then those skilled in the art should be able to study the drawing and readily perceive how to select any idle vertical.

Assume that vertical 1 is busy and vertical 0 is idle when line 000 calls trunk 00. From FIG. 13, we learn that this is also a call from line pattern 0 to trunk pattern 0. Thus, the following relays and contacts operate (FIG. 22) LVT1, $LP^0$, $TP^0$. With relay LVT1 operated contacts 209 are operated and 208 are not operated. With contacts 208 unoperated, relay CHLA is not operated, thus indicating that a single vertical call can be completed. Relay LCHA operates in FIG. 24, and contacts 222 operate in FIG. 22. The off normal ground at contacts 221 is applied through operated contacts 222, $SVP_5$, $TP_3{}^0$, $LP_5{}^0$, operated contacts 209, unoperated contacts 208, and the winding of relay LV0 to battery. Operation of relay LV0 applies ground through operated contacts 227 to pull magnet 229 and select idle vertical 0.

For one final example of a single vertical call, assume that line 000 wishes to call trunk 10. Line pattern relay $LP^0$ and trunk pattern relay $TP^1$ operate for reasons which should be apparent from a study of FIGS. 13 and 17. This time, the two verticals which are adapted to complete a single vertical call are verticals 02 and 03. Assume that vertical 02 is busy and vertical 03 is idle.

In FIG. 22, test relay LVT2 is operated and relay LVT3 is not operated owing to the busy potential on vertical 02, but not on vertical 03. Thus, it follows that contacts 230 are operated and 231 are not operated. There is no path for operating relay CHLA; a one vertical call may be completed. In FIG. 24, relay LCHA operates because contacts CHLA1 are unoperated. In FIG. 22, LCHA contacts 222 close, and ground is applied through contacts 221, 222, $SVVP_5$, $TP_3{}^1$, $LP_6{}^0$, 231, and the winding of relay LV3 to battery. Contacts 232 close, and magnet 233 operates to select the vertical 03 which was assumed to be idle.

With these three examples in mind, it is thought that those skilled in the art will readily perceive how any single vertical may be selected.

Two vertical call

Next, let it be assumed that it is not possible to complete a signle vertical call because of pre-existing busy conditions. It is necessary to complete a two vertical call as taught by FIG. 5. For a better understanding of the call which is about to be described, please consult FIG. 13 and make the following assumptions. Line 000 wants to call trunk 00. The 00 and 01 verticals which may be used to complete the single vertical connection are busy. Vertical 02 is also busy. However, vertical 03 is idle; therefore, it will be selected and it is irrelevant whether any of the remaining verticals are idle or busy.

Line 000 is in line pattern 0, and trunk 00 is in trunk pattern 0. The first appearance of the trunk pattern 0 (block 133 (FIG. 13)) cannot be used because verticals 00, 01 are busy. The second appearance of trunk pattern 0 (block 234 (FIG. 13)), is at verticals 14, 15. It is here assumed that vertical 14 is idle. Therefore, it becomes irrelevant whether any other vertical is idle or busy in trunk pattern 0. From section 124 of FIG. 13, it is seen that junctor 3 is common to verticals 03 and 14 which are here assumed to be the idle verticals which will be used, i.e. there is an idle junctor, and the equipments connected to its ends are also idle. If junctor 3 is idle, we note that the criteria taught by FIG. 12 has been met. Thus, under the present assumptions, the function of the channel selection circuit of FIG. 24 is to select junctor 3 and verticals 03 and 14.

Means are provided for selecting the verticals and junctors required for completing a two-vertical connection, these are the verticals 68, 70 and junctor 69 in FIG. 5. More particularly (FIG. 22), test relays LVT0, LVT1, and LVT2 operate responsive to the assumed busy vertical grounds. Thus, contacts 208, 209 are operated. Relay LVT3 does not operate because vertical 03 is not marked by a busy ground potential. Line 000 is in line pattern 0 and trunk 00 is in trunk pattern 0; therefore, all contacts marked $LP^0$ and $TP^0$ are operated.

The circuitry of FIGS. 16–18 has selected the equipment in which it is possible to complete a single vertical call; therefore, the single vertical possible relay SVP (FIG. 18) has operated contacts SVP in FIGS. 22, 24. A circuit may be traced from ground through the busy indicating contacts, 208, 209, and contacts $LP_5{}^0$, $TP_3{}^0$, $SVP_5$, 222 (released) and the winding of relay CHLA to battery. The relay CHLA operates to indicate that the one vertical call cannot be completed at this time because both of the two possible, one vertical connections are busy. In FIG. 24, the CHLA contacts operate to prevent relay LCHA from operating and to forward the ground potential at 212 to operate relay LCH0. However, in FIG. 22, ground is also applied through contacts 208, 209, $LCH_2{}^0$, and the diode 226 to operate relay CHL0 via its upper winding. Relay CHL0 closes its contacts 235 (FIG. 24) to busy mark the channel 0 and forward the ground potential 212 to relay LCH2. In FIG. 22, contacts 230 are operated and contacts 231 are not operated because vertical 02 is busy (test relay LVT2 is operated) and vertical 03 is idle (test relay LVT3 is not operated). Since contacts 231 are not operated, relay CHL2 cannot operate. Therefore, contacts 236 do not operate in FIG. 24.

In the manner explained in connection with the single vertical call, ground 212 is applied through contacts 236 to operate relay LCH2. Its "X" or preliminary contacts 237 operate first to lock it to ground at contacts 215. Contacts 238 open to break the holding circuit for relays LCH4–LCH7. This is only a safety precaution since contacts 236 are not operated and these relays should not operate at this time.

Relay LCH2 operates contacts 240 (FIG. 22*b*) to complete a circuit from off normal ground applied through contacts 221, 240, 231 and the winding of relay LV3 to battery. Relay LV3 operates, locks in its operated condition at its "X" or preliminary contacts, while opening its contacts 241 to break the locking circuit for other LV relays. Contacts 232 operate to pull magnet 233 and select the third vertical.

Under the foregoing assumptions, it is seen from FIG. 13 that the first step has been accomplished since vertical 03 has been selected; this is vertical 68 in FIG. 5.

Means are provided for selecting an idle trunk vertical for completing the call (this is the vertical 70 in FIG. 5). In greater detail, reference may be made to FIG. 23 for the trunk channel selection circuit.

With the assumptions which have been made, it is apparent from FIG. 13 that the call will be completed in the single switch 0 via its verticals 03, 14, and junctor 3. However, it is irrelevant that this is a single switch. If the assumptions had been different and the call would have been made via verticals 03, 32, and junctor 2, for example, the call would be completed in exactly the same manner, but with other duplicate equipment. FIGS. 22, 23 provide a generic disclosure of verticals 0, 1 . . . 7. The circuit is duplicated any number of times, as required, to complete the common control circuits which are necessary for the size of the system. Also, the test relays in FIGS. 22 and 23 are applied to other verticals by the operation of the proper line unit connector relays 204. It should be fully appreciated that this time the relays LTV0, LV0, etc., can be associated with verticals 10, 11, etc., as well as with verticals 00, 01, etc.

When the trunk connector (FIG. 23) operates, the trunk vertical test relays TVT0 . . . TVT7 operate if the associated verticals are busy or remain unoperated if they are idle. Thus, if verticals 10 and 11 are busy, relays TVT0 and TVT1 operate when contacts such as 205, 203 close. With relays TVT0 and TVT1 operated, a circuit is completed from ground through contacts 210, 211, and 250 to conductor 251, which also appears in FIG. 22*b*. In FIG. 22, the circuit continues through unoperated contacts 252 and diode 253 to the upper winding of relay CHL0. The CHL0 contacts 235 (associated with verticals 10, 11) operate in FIG. 24 to preclude the selection of the busy channel 0. In FIG. 23, the TVT1 and TVT0 contacts 256, 257 close to apply ground through contacts 258, 259, conductor 260, FIG. 22, conductor 260, contacts 261, and diode 262 to operate relay CHL1.

It is noted that the even-numbered channels or junctors 0, 2, 4, 6, have the same sequence of appearances in every line pattern. The odd-numbered channels or junctors 1, 3, 5, 7 have a different sequence of assignments in each line pattern. Therefore, the exact wiring leading to each odd-numbered channel or junctor changes from line pattern to line pattern. The drawings show this by listing the relays, and other equipment, associated with the even-numbered channels first and the relays and other equipment, associated with the odd-numbered channels last (e.g. relays CHL0, CHL2, CHL4, CHL6 are above relays CHL1, CHL3, CHL5, CHL7 (FIG. 22) and relays LCH0, LCH2, LCH4, LCH6 are on the left of relays LCH1, LCH3, LCH5, LCH7 (FIG. 24)).

The assumption is that channel or junctor 3 is selected for the call being described since all preceding channels are busy because of other pre-existing calls and are unavailable for use by this call. According to the configuration of wires in the equipment shown in FIG. 24, channel 3 is here selected only if the channels 0, 2, 4, 6, 1 are busy. Of course, these wires may be slipped in other circuits, as required to equalize the wear on equipment, according to known techniques. Therefore, in some other equipment perhaps channel 3 might be the first preference.

The preceding description has explained how the CHL relays (FIG. 22) are operated by either the line channel test circuit of FIG. 22 or the trunk channel test circuit of FIG. 23 if the channel is not available for this call. In addition, these CHL relays are operated over their lower winding if the channel or junctor is busy. From these assumptions and explanations, it is easy to see that if channels 0, 2, 4, 6, 1 are themselves busy, the contacts $CHL^0$, $CHL^2$, $CHL^4$, $CHL^6$, $CHL^1$ are operated in FIG. 24. Also, the one vertical call cannot be completed so that relay CHLA is operated. Therefore, the ground 212 is applied to the winding of the relay LCH3. Operation of relay LCH3 selects channel 3.

When the channel select relay operates (LCH3, in the present case), a contact closes which obtains its ground from the off normal contact 220, FIG. 22. With relay LCH3 operated in FIG. 24, contacts 265 operate in FIG. 22. The ground at contacts 220 feeds through contacts 265 to FIG. 23*b* and wire 265; trunk pattern contacts $TP0_5$ (that is where block 234 is located in FIG. 13), unoperated TVT4 contacts 268 to wire 266 which is connected directly to wire 267, and then through the winding of relay TV4 to battery. Relay TV4 operates (which is the equivalent of the selection of vertical 14, FIG. 13, in trunk pattern 0). If the assumption had been that vertical 14 is busy and vertical 15 would have been used, the contacts 268 of relay TVT4 would have been operated. Therefore, relay TV5 would now be operated via the operated contacts 268.

When relay TV4 operates, contacts 269 colse to operate the magnet 270 and thereby select vertical 4—in this case vertical 14. Thus, the two vertical call of FIG. 5 has been completed.

Since it is somewhat involved to trace the call through the various drawings, it may be well to briefly restate the operations which have just been described. Vertical test relays LVT and TVT (FIGS. 22*a*, 23*a*) are operated to store a memory of the busy and idle conditions of the verticals. The various channel select relays CHL (FIG. 22*b*) operate selectively if they are associated with a busy line vertical, trunk vertical, or channel junctor. The SOK relay operates in FIG. 24 to demand a channel—ground then reaching the first idle and available LCH relay via a chain of the contacts on the CHL rleays. The LCH relay which operates over this chain, closes contacts which operate LV relays in FIG. 22 and TV relays in FIG. 23 for trunk and line vertical selection. The call is then established over the selected verticals.

Link call

A number of general principles have been stated setting forth the broad concept of how to go about designing a switching system incorporating the present invention. Among the more important principles are (1) a single vertical should be used where possible to complete a connection, and (2) the switching path should go through a progressively larger number of stages as the size of the system increases. These principles have also been described in connection with particular hardware for making a particular network. However, it must be understood that the particular network may vary, and that the nature of the hardware may also vary and still remain within the scope of the invention.

For example, FIG. 3 shows how a single vertical may be used to connect a line to a trunk, and FIG. 10 shows how to complete a single link vertical connection through a link switch. Likewise, FIG. 9 shows two ways of distributing the junctors to complete some or all connections through a link switch. In other sized systems, these plans might violate the principle of the invention which requires the connections to go through a proper number of stages for a given size system. In those other size systems, perhaps the junctors will extend between certain line units and through a link stage in a different manner, and perhaps the junctors running directly from one line unit to another will also be connected in a different manner. One link plan is shown by the lineargraph of FIG. 25A, another is shown by the lineargraph of FIG. 25B. Yet another might be either of these with different numbers of paths between any one or more of the node points. For example, FIG. 25A shows four nodes adjacent the right-hand line units. Each node has two outgoing junctors. By a simple duplication of the pattern either the number of line units or the number of nodes could be doubled. In like manner, the invention broadly contemplates many plans laid out according to the principles stated herein and according to the needs of a particular system.

For these and other reasons, it should be understood that the description which follows describes a preferred relay circuit for making a link selection and not necessarily a preferred line, trunk, and link layout plan of the type shown by and described in connection with FIGS. 3, 8, 9, 10 and 25. The preferred relay circuit may be adapted to any suitable number of plans.

The last cvall to be described is the most complicated one utilizing link switches, as shown in FIGS. 9–11. This call may require either one or two link switches depending upon the path to be taken and the size of the exchange.

FIG. 25A is a network lineargraph showing every possible path from line 300 to trunk 301 for a system wherein the line and trunk are in different frame groups. All of the verticals and junctors which are available for use in the two link switch call are shown in FIG. 25A since it includes the more simple one link switch version. The line may be connected into the switching network via a crosspoint associated with any one of eight verticals shown at 302. These verticals have access to the eight junctors shown at 303. The two link switches are also joined together by junctors which are connected to the second verticals shown at 305. If the call is of the type using a single link switch (FIG. 10), the verticals 305 connect directly to the line unit junctors 306. If the call requires two link switches, the verticals at 305 are connected via link junctors 307 to the verticals 308 of a second link switch. Finally, the connection may be completed across junctors 309 to the trunk verticals at 310.

The equipment, about to be described, will select a route or path through the link switch unit or units which are capable of completing a call. The situation required to make such a selection is very much like that described above in connection with FIG. 12. That is, the path is available if a link junctor and the equipment connected to each of its ends are idle. Thus, a selection of a link junctor is the equivalent of a selection of a path. Translated more specifically into the present situation, the link channel 00, for example, is available if the 00 one of the link junctors 307 is idle and the link switch vertical 00 connected to each of its ends (at 305, 308) is also idle and available.

FIG. 26, 27 (which should be joined as shown by FIG. 28) include link test relays $LKT^{00}$, $LKT^{01}$ . . . $LKT^{17}$ which correspond to the numbers on the link junctors 307 in FIG. 25A. Thus, for example, relay $LKT^{00}$ (FIG. 26) identifies line *b* in FIG. 25A, relay $LKT^{17}$ (FIG. 27) identifies line *e* in FIG. 26. By inspection, the relationship between the remaining lines in FIG. 25A and the relays in FIGS. 26, 27 should become apparent. It should also be apparent that the selection of line *b* in FIG. 25A is equivalent to a selection of lines *a* and *c*. Likewise, a selection of line *e* is equivalent to a selection of the lines *d* and *f*. Thus, an operation of relay $LKT^{00}$ for example, results in a selection of the link route represented by the lines *a*, *b*, *c*. Likewise, an operation of relay $LKT^{17}$ results in a selection of the route represented by the lines *d*, *e*, *f*. In a similar manner, any other route may be selected by an operation of the corresponding one of the relays $LKT^{01}$–$LKT^{16}$.

Next to be described is the manner in which one of the link channel test relays LKT of FIGS. 26, 27 is operated when a channel is busy. The channel 00, for example, is busy if any of the path sections represented by the lines *a*, *b*, *c*, is busy. Thus, there are three test circuits 317, 318, 319 for each of the LKT relay. Circuits 317 represent the lineargraph section including line *a*, 318 the section including line *b*, and 314 the section including line *c*.

The link channel selection begins with an operation of link unit and link connector relays somewhat in the manner described in connection with FIG. 15. This relay operation results in a selective marking of conductors 320, 321 (FIGS. 26, 27), according to the busy or idle conditions of the verticals. At 322, 323, the drawing shows a full complement of link unit equipment. However, to conserve space, it shows only the first and last vertical equipment V0, V7 and V10, V17 of another link unit at 324, 325. It should be understood that other vertical equipment (not shown) will be provided to complete the units 324, 325 in a manner which should be obvious from the disclosure at 322, 323.

The series of contacts at 317 tests the link switch #1 (e.g. wire *a* is marked with either of two potentials depending upon whether the junctor corresponding to line *a* (FIG. 25A) is idle or busy). The series of contacts at 318 tests the link junctors 307 (e.g. wire *b* is marked with either of the same two potentials depending upon whether the junctor corresponding to line *b* (FIG. 25A) is idle or busy). The series at 319 tests the link switch #2 (e.g. wire *c* is marked with either of the same two potentials depending upon whether the junctor corresponding to line *c* (FIG. 25A) is busy or idle).

The dashed line circle 333 encloses contacts which are operated by any suitable equipment when the junctors 335, 336 (FIG. 25A) are busy. Obviously, node 337 is busy if junctors 335, 336 are busy; therefore, paths 00, 01, 02, 03 cannot be used to complete the call represented by this lineargraph. This is somewhat like saying that crosspoint 83 (FIG. 6) cannot close a path to junctor 84 when the vertical 0 is busy. However, the junctor 84 is not out of service to all calls because some other equipment associated with vertical 1, for example, could make a connection to the junctor 84. Likewise, in FIG. 25A, the fact that node 337 is busy does not necessarily mean that paths 00–03 are barred to equipment which is completing other calls.

From an inspection of FIG. 26, it should be apparent that relay LKT00 operates if any one or more of four busy-idle conditions exist, namely: contacts 333 are operated to indicate that junctors 335, 336 are busy; wire *a* is marked to indicate that vertical 00 (link switch #1) is busy; wire *b* is marked to indicate that link junctor 00 is busy; wire *c* is marked to indicate that vertical 00 (link switch #2) is busy. By looking at FIG. 25A, it becomes apparent that relay LKT00 is operated if the path 00 is unavailable to this call and unoperated if the path 00 is available.

In like manner, any of the other paths are not available if the corresponding LKT relay (FIG. 27) operates and are available if the LKT relay does not operate.

The diodes 241, 242, and similar diodes, are isolating diodes.

Upon inspection of FIG. 25A, it should be apparent that switch paths being extended from left to right must pass through node points 337, 350, 351, 352. Equally obvious, junctor groups 0, 2; 1, 3; 4, 6; 5, 7 go through the respective node points. Upon inspection of FIG. 24, it will also be obvious that diodes 337*a*, 350*a*, 351*a* set off the four junctor groups 0, 2; 1, 3; 4, 6; 5, 7. Thus, these diodes divide FIG. 24 in the same manner that the correspondingly numbered nodes divide the paths in FIG. 25A.

In a similar manner, the trunk side junctors are divided into groups by the node points 253–256.

An inspection of FIG. 29 will disclose a number of relays marked 337, 350–356 (with the letter *b* as a suffix). Each of these relays represents a similarly numbered node point in FIG. 25A. These relays are operated if the indicated junctors are busy. Thus, for example, if junctors 335, 336 are busy, node 337 cannot be used. Junctors 335, 336 are parts of channels 0 and 2; therefore a circuit is completed by the 0 and 2 CHL relays (FIG. 22*b*) for operating relay 337*b* (FIG. 29). Likewise, any other similarly busy junctors will operate a corresponding relay in FIG. 29. These relays control the LA/TA contacts in FIGS. 26 and 27 (e.g. contacts 233) which, in turn, control the operation of the relays LKT. That is, an LKT relay cannot operate if the pertinent node point is busy.

The link selection circuit works this way. Assume that there is a demand for a link channel. If lines *a*, *b*, *c*, are idle and available, relay $LKT^{00}$ is not operated. If any one of the lines *a*, *b*, *c*, are busy, the relay $LKT^{00}$ is operated. In FIG. 29, the contacts 360 operate or remain unoperated depending upon the condition of relay $LKT^{00}$. If contacts 360 are unoperated, relay $LK^{00}$ operates to select channel 00. If contacts 360 are operated, relay $LK^{01}$ operates to select channel 01. In the like manner, any busy signals cause the demand placed by a closure of contacts ON to be passed on to the next LK relay in the preference chain of FIG. 29. These LK relays select one of the junctors 307 (FIG. 25A).

In FIG. 24, an operated LK relay closes a circuit for operating a channel selection relay LCH which will select one of the junctors 303. Thus, for example, if relay $LK^{00}$ operates to select link channel 00, contacts $LK_2^{00}$ operate to feed a ground from contacts K3 to contacts LCH0 or LCH2. It may be recalled from FIG. 16 that the relay K operated the contacts K3 (FIG. 24) whenever a link is required to complete a call. Depending upon the busy or idle condition of junctors 303 (FIG. 25A) one of the LCH relays operates. The channel selection then continues as described above.

The junctors 307 are selected in a similar manner. Another circuit, similar to FIG. 24, is associated with the junctor group 307. If the link channel 00 is selected, contacts $LK_3^{00}$ close a circuit from the ground applied through the contacts K3, to a preference chain of contacts 362. Again, one of the TCH relays operates depending upon the busy or idle conditions. If trunk channel 0 is busy, relay CHT0 (FIG. 23*b*) is operated, and contacts 363 (FIG. 24) are operated to pass the ground signal on to the relay TCH2.

One of the relays TCH (FIG. 24) operates according to the busy condition and preference chain connections. This, in turn, closes a TCH relay in FIG. 23*b* to operate a CHT relay and select the desired channel.

From FIG. 25A, it should now be apparent that one of the junctors has been selected in each of the groups 303, 307, 306. Therefore, a complete channel has been selected through two line units and a link stage.

The description is thought adaquate to teach those skilled in the art. Therefore, no attempt will be made at this time to explain how the single vertical connections may be completed in one other link stage. It should be understood, however, that the invention is broad enough to cover such single vertical connections in one link stage.

While the principles of the invention have been described above in connection with specific apparatus and applications, it is to be understood that this description is made only by way of example and not as a limitation on the scope of the invention.

We claim:

1. A channel selector for a multi-stage switching system, said switching system having a plurality of access points with a plurality of alternative paths therebetween, wherein the system is divided into switching units, said access points being scattered throughout said units, means for locating calling and called access points in terms of the units in which said calling and called points are located, means for normally selecting the one of said units which is common to said calling and called access points if there is such a unit which is then idle, the various ones of said plurality of paths including different numbers of said stages, means in said channel selector for testing at least a section of said paths for busy and idle conditions, means responsive to said testing means for selecting the path including the least number of said stages which is idle and available at the time of testing, and means for detecting a failure to find a demanded switch path connection, means responsive to said detection of said failure for recycling said channel selector means, and means responsive to said recycle for randomly selecting any one of said units having access to said calling access point.

2. The channel selector of claim 1 wherein said testing means tests a section of said path and the equipment connected to each of its ends.

3. The channel selector of claim 1 and means for selecting a path extending through a progressively larger number of said stages as the size of the system interposed between said access points increases.

4. The channel selector of claim 1 and means for operating said system to complete a desired connection in any one of several different optional modes of system operation, there being a definite preference order among said modes depending upon the availability of certain equipment, and means for selecting the mode of operation having the highest order of preference then available.

5. A channel selector for a multi-stage switching system, said switching system having a plurality of access points with a plurality of alternative paths therebetween, wherein the system is divided into switching units, said access points being scattered throughout said units, means for locating calling and called access points in terms of the units in which said calling and called points are located, means for normally selecting the one of said units which is common to said calling and called access points if there is such a unit which is then idle, the various ones of said plurality of paths including different numbers of said stages, means in said channel selector for testing at least a section of said paths for busy and idle conditions, means responsive to said testing means for selecting the path including the least number of said stages which is idle and available at the time of testing, means for monitoring said system for light traffic and heavy traffic conditions, and means responsive to a detection of said light traffic conditions for canceling said normal unit selection and substituting a random unit selection.

6. A channel selector for a network comprising an array of crossbar switches, each of said switches having verticals which are cut to provide a plurality of electrically isolated sections, one of said sections forming entrance points of access to said network, another of said sections forming exit points of access from said network, means for selecting one of said verticals which is common to an entrance and an exit point, means for completing a one vertical connection from said entrance point to said exit point via said selected vertical, wherein said switching system includes a pair of duplicate verticals for completing every possible single vertical call, and means whereby said vertical selection means selects one of the pair of verticals responsive to an idle test of said pair of verticals.

7. The channel selector of claim 6 and means comprising a third of said sections for completing connections between said verticals, and means responsive to a detection of a busy condition on said one vertical for selecting two vertical joined via said means comprising said third of said section, and means for completing a two vertical connection from said entrance point to said exit point via said two selected verticals and wiring extending through said third section.

8. The channel selector of claim 6 wherein said busy detection means comprises means for busy testing equipment associated with said third of said section and equipment connected thereto.

9. The channel selector of claim 7 wherein said array of switches is functionally a single switching unit, a plurality of said units being joined together into frame groups by means of the wiring through said third of said sections, said wiring being spread in groups between individual ones of said units, and means in said channel selector for selecting a particular one of said wires to carry a particular call, thereby selecting the units connected to either end of said wires.

10. The channel selector of claim 9 and means comprising link switching stages interposed between said switching units to increase the number of cascaded stages available for any connection from an entrance point to an exit point.

11. The channel selector of claim 10 wherein some of said groups of wires run directly between said units and some of said groups of wires run through said link stages, and means in said channel selector for preferring said direct wire connections over said link wire connections when said direct wire connections are idle and available.

12. The channel selector of claim 10 wherein all of said groups of wires run through said link stages.

13. The channel selector of claim 9 wherein said entrance and exit points are scattered through said switching units, at least some of said entrance and exit points being located on the same switch, in different switches in the same unit, in different units within the same frame group, and in different frame groups, means for detecting the locations of said entrance and exit points with respect to each other and the distance through the network in terms of the number of stages separating said points, and means responsive to said detection of said locations of said points for selecting the shortest available path through said system.

14. A channel selector comprising a switching network utilizing a plurality of arrays of crossbar switches, each of said switches having verticals which are cut to provide a plurality of electrically isolated sections of crosspoints, one of said sections forming entrance points to and another of said sections forming exit points from said network, a third of said sections of crosspoints for providing intra-network connections between said verticals, there being a plurality of optional paths through said network, said optional paths having a given order of preference, means for coupling originating and terminating circuits to said two sections in predetermined entrance and exit patterns, said patterns having a predetermined relationship with respect to each other, means in said channel selector for selecting the entrance and exit patterns of said originating and terminating circuits, means responsive to said pattern selection for completing a path through said network, if said path is then available, busy testing means in said channel selector for testing said intra-network connections if said path is not then available, means jointly responsive to said pattern selection means and said busy testing means for thereafter changing said order of preference, and means responsive to said busy testing means for completing a connection from a given originating circuit to a selected terminating circuit.

15. The channel selector of claim 14 and means for locating the crosspoints in said network associated with said originating and terminating circuit, said location being fixed according to the coordinates of such crosspoints, and means for completing said path between the coordinates of such crosspoints.

16. The channel selector of claim 14 wherein a plurality of said arrays of switches are joined together into a unit by said intra-network connections, said entrance and exit points being scattered throughout said arrays, and means for giving first preference to a path within a unit when a path within a single array is not available.

17. The channel selector of claim 16, there being a number of said units joined together by inter-unit switching stages, and means for giving first preference to a path within a unit when a path within a single array is not available.

18. The channel selector of claim 17 and means for completing a path through the least number of said inter-unit switching stages when no intra-unit path is available.

References Cited

UNITED STATES PATENTS

| | | | |
|---|---|---|---|
| 3,155,775 | 11/1964 | Zarouni. | |
| 3,313,888 | 4/1967 | Ohno | 179—22 |
| 3,317,676 | 5/1967 | Ekbergh et al. | 179—22 |
| 3,414,681 | 12/1968 | Ekbergh et al. | |
| 3,441,677 | 4/1969 | Erwin et al. | 179—18.21 |

KATHLEEN H. CLAFFY, Primary Examiner

W. A. HELVESTINE, Assistant Examiner